(12) United States Patent
Song et al.

(10) Patent No.: US 11,811,254 B2
(45) Date of Patent: *Nov. 7, 2023

(54) POWER CONVERSION CIRCUIT, AND CHARGING APPARATUS AND SYSTEM

(71) Applicant: Huawei Technologies Co., Ltd., Shenzhen (CN)

(72) Inventors: Jun Song, Xi'an (CN); Pengfei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,402

(22) Filed: Jul. 8, 2022

(65) Prior Publication Data
US 2023/0017143 A1 Jan. 19, 2023

Related U.S. Application Data

(63) Continuation of application No. 16/706,030, filed on Dec. 6, 2019, now Pat. No. 11,404,895, which is a (Continued)

(30) Foreign Application Priority Data
Jun. 8, 2017 (CN) .......................... 201710429394.6

(51) Int. Cl.
*H02J 7/00* (2006.01)
*H02M 3/07* (2006.01)

(52) U.S. Cl.
CPC .......... *H02J 7/007* (2013.01); *H02J 7/00034* (2020.01); *H02J 2207/20* (2020.01); *H02M 3/07* (2013.01)

(58) Field of Classification Search
CPC ........ H02J 7/007; H02J 7/0045; H02J 7/0052; H02J 7/0065; H02J 7/0008; H02J 7/00034; H02J 2207/20; H02M 3/07
(Continued)

(56) References Cited

U.S. PATENT DOCUMENTS 6,304,068 B1 10/2001 Hui et al.
10,903,678 B2 * 1/2021 Lynds ..................... H02J 7/345
(Continued)

FOREIGN PATENT DOCUMENTS

| CN | 201369577 A | 12/2009 |
|---|---|---|
| CN | 104052278 A | 9/2014 |

(Continued)

*Primary Examiner* — Edward Tso
*Assistant Examiner* — Aaron Piggush
(74) *Attorney, Agent, or Firm* — Conley Rose, P.C.

(57) ABSTRACT

A power conversion circuit includes a first end of a first switch element coupled to an input power supply; a second end of the first switch element coupled to a first end of a first energy storage element, and a first end of a second switch element; a second end of the first energy storage element coupled to ground through a third switch element, and a first end of a fourth switch element; a second end of the second switch element coupled and connected to a battery; a first end of a second energy storage element coupled to two ends of the first energy storage element through a fifth switch element and a sixth switch element; a second end of the second energy storage element coupled to the battery; and a second end of the fourth switch element coupled to the battery.

20 Claims, 15 Drawing Sheets

Related U.S. Application Data continuation of application No. PCT/CN2018/090279, filed on Jun. 7, 2018.

(58) Field of Classification Search
USPC ............ 320/107, 133, 140, 145, 158, 163
See application file for complete search history.

(56) References Cited

U.S. PATENT DOCUMENTS

| | | |
|---|---|---|
| 11,404,895 B2 * | 8/2022 | Song .................. H02M 7/4837 |
| 2008/0157733 A1 | 7/2008 | Williams |
| 2013/0038305 A1 * | 2/2013 | Arno ...................... H02M 3/07 |
| | | 323/282 |
| 2016/0134148 A1 | 5/2016 | Ide et al. |
| 2017/0085224 A1 | 3/2017 | Youn et al. |
| 2017/0126133 A1 * | 5/2017 | Yang ................ H02M 3/33576 |
| 2018/0083457 A1 | 3/2018 | Huang |
| 2018/0083458 A1 * | 3/2018 | Huang ................ H02J 7/0045 |
| 2018/0083459 A1 | 3/2018 | Huang et al. |
| 2019/0372462 A1 | 12/2019 | Song et al. |

FOREIGN PATENT DOCUMENTS

| | | |
|---|---|---|
| CN | 205945143 A | 2/2017 |
| CN | 106685219 A | 5/2017 |

\* cited by examiner

POWER CONVERSION CIRCUIT, AND CHARGING APPARATUS AND SYSTEM

CROSS-REFERENCE TO RELATED APPLICATIONS

This is a continuation of U.S. patent application Ser. No. 16/706,030 filed on Dec. 6, 2019, which is a continuation of International Patent Application No. PCT/CN2018/090279 filed on Jun. 7, 2018, which claims priority to Chinese Patent Application No. 201710429394.6 filed on Jun. 8, 2017. The disclosures of the aforementioned applications are hereby incorporated by reference in their entireties.

TECHNICAL FIELD

This application relates to the field of circuits, and further, to a power conversion circuit, and a charging apparatus and system.

BACKGROUND

For a long time, batteries have always been used as power supplies for mobile electronic apparatuses. A battery provides energy, in a form of a voltage or a current, that allows a circuit to operate. However, energy stored in a battery is limited, and when an electronic apparatus is in use, the battery loses electric power. When an energy supply of the battery is exhausted, a voltage of the battery starts to decrease from a rated voltage of the battery, and the electronic apparatus that obtains electric power depending on the battery is not suitable for continuing operating. To enable the battery to be full of energy again, a battery charging system in a specific form is required.

Usually, a battery charging system includes a power adapter and a charging apparatus. Energy and information are usually transferred between the power adapter and the charging apparatus through a Universal Serial Bus (USB) cable. A purpose of the power adapter is to transfer energy of a utility power supply to the charging apparatus in a specific voltage manner. A purpose of the charging apparatus is to perform voltage transformation on energy obtained using the power adapter and then transfer energy to the battery.

Currently, an existing battery charging system supports only one voltage mode. However, different batteries support different quantities of electricity, voltages, and currents. When charging is limited, if an excessively large voltage or current is supplied to a battery, the battery may be damaged or even explode; or if an excessively small voltage or current is supplied to a battery, a charging process may be inefficient or completely ineffective.

SUMMARY

This application provides a power conversion circuit, and a charging apparatus and system, to support a plurality of charging modes and effectively increase a battery charging rate.

According to a first aspect, a power conversion circuit is provided, where the power conversion circuit includes a first switch element, a second switch element, a third switch element, a fourth switch element, a fifth switch element, a sixth switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the first energy storage element, a first end of the second switch element, and a first end of the fifth switch element; a second end of the first energy storage element is separately coupled to a first end of the third switch element, a first end of the fourth switch element, and a first end of the sixth switch element; a second end of the second switch element is coupled and connected to a battery through a second external connection end of the power conversion circuit; a second end of the fifth switch element is separately coupled to a first end of the second energy storage element and a second end of the sixth switch element; a second end of the second energy storage element is coupled to the second external connection end; a second end of the fourth switch element is coupled to the second external connection end; and a second end of the third switch element is grounded.

In a possible implementation of the first aspect, the power conversion circuit further includes a seventh switch element, where a first end of the seventh switch element is separately coupled to the second end of the first switch element, the first end of the second switch element, the first end of the fifth switch element, and the first end of the first energy storage element; and a second end of the seventh switch element is separately coupled to the first end of the third switch element, the first end of the fourth switch element, the first end of the sixth switch element, and the second end of the first energy storage element.

According to a second aspect, a charging apparatus is provided, where the charging apparatus includes the power conversion circuit in the foregoing aspect and implementation, an input/output port, and an information collection and signal control circuit coupled to the power conversion circuit, and the information collection and signal control circuit is coupled and connected to the input/output port.

In a possible implementation of the second aspect, the information collection and signal control circuit includes a digital core processing element, a battery information detection element, an output drive element, an information input element, a first power conversion element, and a second power conversion element. In the information collection and signal control circuit, the information input element, the first power conversion element, and the second power conversion element are separately coupled and connected to the input power supply through a first external connection end of the information collection and signal control circuit; the information input element is connected to the digital core processing element; the first power conversion element is connected to the digital core processing element; the second power conversion element is connected to the output drive element; the digital core processing element is coupled and connected to a data line of a power adapter through a second external connection end of the information collection and signal control circuit; the digital core processing element is connected to the battery information detection element; the battery information detection element is coupled and connected to a battery through a third external connection end of the information collection and signal control circuit; the digital core processing element is connected to the output drive element; and the output drive element is separately coupled to each switch element in the power conversion circuit through a fourth external connection end of the information collection and signal control circuit.

In another possible implementation of the second aspect, a first end of the input/output port is connected to the input power supply of the power adapter, a second end of the input/output port is separately coupled to the first external connection end of the power conversion circuit and the first external connection end of the information collection and signal control circuit, a third end of the input/output port is connected to the data line of the power adapter, and a fourth end of the input/output port is coupled to the second external connection end of the information collection and signal control circuit. Optionally, the input/output port is a USB port.

According to a third aspect, a charging system is provided, where the charging system includes the charging apparatus in the foregoing aspect and implementations, and a power adapter and a battery element that are coupled to the charging apparatus. The charging apparatus and the battery element may be disposed in one device, and the device may be a terminal, a base station, or an electric vehicle.

According to a fourth aspect, a method for charging a battery by a power conversion circuit is provided. Based on a composition structure of the power conversion circuit in the foregoing aspect and implementation, in a possible implementation, the power conversion circuit may charge the battery based on a first charging mode, and the method includes keeping the second switch element and the sixth switch element open, and keeping the fifth switch element closed, where in a first time period, the first switch element and the fourth switch element are in a closed state, the third switch element is in an open state, and the first energy storage element and the second energy storage element are charged; and in a second time period after the first time period, the first switch element and the fourth switch element are in an open state, the third switch element is in a closed state, and the first energy storage element and the second energy storage element are discharged.

In another possible implementation of the fourth aspect, the power conversion circuit may charge the battery based on a second charging mode, and the method includes keeping the fourth switch element and the fifth switch element open, and keeping the sixth switch element closed, where in a first time period, the first switch element is in a closed state, the second switch element and the third switch element are in an open state, and the first energy storage element and the second energy storage element are charged; and in a second time period after the first time period, the first switch element is in an open state, the second switch element and the third switch element are in a closed state, and the first energy storage element and the second energy storage element are discharged.

In another possible implementation of the fourth aspect, the power conversion circuit may charge the battery based on a third charging mode, and the method includes keeping the fifth switch element and the sixth switch element open, where in a first time period, the first switch element and the fourth switch element are in a closed state, the second switch element and the third switch element are in an open state, and the first energy storage element is charged; and in a second time period after the first time period, the first switch element and the fourth switch element are in an open state, the second switch element and the third switch element are in a closed state, and the first energy storage element is discharged.

In another possible implementation of the fourth aspect, the power conversion circuit may charge the battery based on a fourth charging mode, and the method includes keeping the fourth switch element, the fifth switch element, and the sixth switch element open, and keeping the first switch element and the third switch element closed, where in a first time period, the second switch element is in a closed state, and the battery is directly charged; and in a second time period after the first time period, the second switch element is in an open state, and battery charging is suspended.

In another possible implementation of the fourth aspect, the power conversion circuit may charge the battery based on a fifth charging mode, and the method includes keeping the second switch element, the fourth switch element, and the sixth switch element open, and keeping the fifth switch element and the seventh switch element closed, where in a first time period, the first switch element is in a closed state, the third switch element is in an open state, and the second energy storage element is charged; and in a second time period after the first time period, the first switch element is in an open state, the third switch element is in a closed state, and the second energy storage element is discharged.

In another possible implementation of the fourth aspect, the power conversion circuit may charge the battery based on a sixth charging mode, and the method includes keeping the second switch element, the fourth switch element, and the fifth switch element open, and keeping the sixth switch element and the seventh switch element closed, where in a first time period, the first switch element is in a closed state, the third switch element is in an open state, and the second energy storage element is charged; and in a second time period after the first time period, the first switch element is in an open state, the third switch element is in a closed state, and the second energy storage element is discharged.

According to a fifth aspect, another power conversion circuit is provided, where the power conversion circuit includes a first switch element, a second switch element, a third switch element, a seventh switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the second switch element, a first end of the seventh switch element, and a first end of the first energy storage element; a second end of the first energy storage element is separately coupled to a first end of the second energy storage element, a first end of the third switch element, and a second end of the seventh switch element; a second end of the second switch element is coupled and connected to a battery through a second external connection end of the power conversion circuit; a second end of the second energy storage element is coupled to the second external connection end; and a second end of the third switch element is grounded.

Based on a composition structure of the power conversion circuit in the fifth aspect, the power conversion circuit may charge the battery based on a second charging mode or a sixth charging mode.

According to a sixth aspect, another power conversion circuit is provided, where the power conversion circuit includes a first switch element, a second switch element, a third switch element, a fifth switch element, a seventh switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the second switch element, a first end of the fifth switch element, a first end of the seventh switch element, and a first end of the first energy storage element; a second end of the first energy storage element is separately coupled to a first end of the third switch element and a second end of the seventh switch element; a second end of the second switch element is coupled and connected to a battery through a second external connection end of the power conversion circuit; a second end of the fifth switch element is connected to a first end of the second energy storage element; a second end of the second energy storage element is coupled to the second external connection end; and a second end of the third switch element is grounded.

Based on a composition structure of the power conversion circuit in the sixth aspect, the power conversion circuit may charge the battery based on a second charging mode, a fourth charging mode, a fifth charging mode, or a sixth charging mode.

In a possible implementation of the sixth aspect, the power conversion circuit further includes a fourth switch element, where a first end of the fourth switch element is separately coupled to the first end of the third switch element, the second end of the seventh switch element, and the second end of the first energy storage element; and a second end of the fourth switch element is coupled to the second external connection end.

Based on a composition structure of the power conversion circuit in the implementation of the sixth aspect, the power conversion circuit may alternatively charge the battery based on a third charging mode.

According to a seventh aspect, another power conversion circuit is provided, where the power conversion circuit includes a first switch element, a second switch element, a third switch element, a sixth switch element, a seventh switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the second switch element, a first end of the seventh switch element, and a first end of the first energy storage element; a second end of the first energy storage element is separately coupled to a first end of the third switch element, a first end of the sixth switch element, and a second end of the seventh switch element; a second end of the second switch element is coupled and connected to a battery through a second external connection end of the power conversion circuit; a second end of the sixth switch element is connected to a first end of the second energy storage element; a second end of the second energy storage element is coupled to the second external connection end; and a second end of the third switch element is grounded.

Based on a composition structure of the power conversion circuit in the seventh aspect, the power conversion circuit may charge the battery based on a second charging mode, a fourth charging mode, or a sixth charging mode.

In a possible implementation of the seventh aspect, the power conversion circuit further includes a fourth switch element, where a first end of the fourth switch element is separately coupled to the first end of the third switch element, the first end of the sixth switch element, the second end of the seventh switch element, and the second end of the first energy storage element; and a second end of the fourth switch element is coupled to the second external connection end.

Based on a composition structure of the power conversion circuit in the implementation of the seventh aspect, the power conversion circuit may alternatively charge the battery based on a third charging mode.

According to an eighth aspect, another power conversion circuit is provided, where the power conversion circuit includes a first switch element, a second switch element, a third switch element, a fourth switch element, and a first energy storage element. In the power conversion circuit, a first end of the first switch element is coupled and connected to an input power supply through a first external connection end of the power conversion circuit, a second end of the first switch element is separately coupled to a first end of the second switch element and a first end of the first energy storage element, a second end of the first energy storage element is separately coupled to a first end of the third switch element and a first end of the fourth switch element, a second end of the second switch element is coupled and connected to a battery through a second external connection end of the power conversion circuit, a second end of the fourth switch element is coupled to the second external connection end, and a second end of the third switch element is grounded.

Based on a composition structure of the power conversion circuit in the eighth aspect, the power conversion circuit may charge the battery based on a third charging mode or a fourth charging mode.

In a possible implementation of the eighth aspect, the power conversion circuit further includes a fifth switch element and a second energy storage element, where a first end of the fifth switch element is separately coupled to the second end of the first switch element, the first end of the second switch element, and the first end of the first energy storage element; a second end of the fifth switch element is connected to a first end of the second energy storage element; and a second end of the second energy storage element is coupled to the second external connection end.

Based on a composition structure of the power conversion circuit in the implementation of the eighth aspect, the power conversion circuit may alternatively charge the battery based on a first charging mode.

According to a ninth aspect, another power conversion circuit is provided, where the power conversion circuit includes a first switch element, a second switch element, a third switch element, a sixth switch element, a first energy storage element, and a second energy storage element. In the power conversion circuit, a first end of the first switch element is coupled and connected to an input power supply through a first external connection end of the power conversion circuit, a second end of the first switch element is separately coupled to a first end of the second switch element and a first end of the first energy storage element, a second end of the first energy storage element is separately coupled to a first end of the third switch element and a first end of the sixth switch element, a second end of the second switch element is coupled and connected to a battery through a second external connection end of the power conversion circuit, a second end of the sixth switch element is connected to a first end of the second energy storage element, a second end of the second energy storage element is coupled to the second external connection end, and a second end of the third switch element is grounded.

Based on a composition structure of the power conversion circuit in the ninth aspect, the power conversion circuit may charge the battery based on a second charging mode or a fourth charging mode.

In a possible implementation of the ninth aspect, the power conversion circuit further includes a fourth switch element, where a first end of the fourth switch element is separately coupled to the first end of the third switch element, the first end of the sixth switch element, and the second end of the first energy storage element; and a second end of the fourth switch element is coupled to the second external connection end.

Based on a composition structure of the power conversion circuit in the implementation of the ninth aspect, the power conversion circuit may alternatively charge the battery based on a third charging mode.

According to a tenth aspect, another power conversion circuit is provided, where the power conversion circuit includes a first switch element, a third switch element, a fourth switch element, a seventh switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the seventh switch element, a first end of the first energy storage element, and a first end of the second energy storage element; a second end of the first energy storage element is separately coupled to a first end of the third switch element, a first end of the fourth switch element, and a second end of the seventh switch element; a second end of the second energy storage element is coupled and connected to a battery through a second external connection end of the power conversion circuit; a second end of the fourth switch element is coupled to the second external connection end; and a second end of the third switch element is grounded.

Based on a composition structure of the power conversion circuit in the tenth aspect, the power conversion circuit may charge the battery based on a first charging mode or a fifth charging mode.

According to an eleventh aspect, another power conversion circuit is provided, where the power conversion circuit includes a first switch element, a third switch element, a fourth switch element, a fifth switch element, a sixth switch element, a seventh switch element, a first energy storage element, and a second energy storage element. In the power conversion circuit, a first end of the first switch element is coupled and connected to an input power supply through a first external connection end of the power conversion circuit; a second end of the first switch element is separately coupled to a first end of the fifth switch element, a first end of the seventh switch element, and a first end of the first energy storage element; a second end of the first energy storage element is separately coupled to a first end of the third switch element, a first end of the fourth switch element, a first end of the sixth switch element, and a second end of the seventh switch element; a first end of the second energy storage element is separately coupled to a second end of the fifth switch element and a second end of the sixth switch element; a second end of the second energy storage element is coupled and connected to a battery through a second external connection end of the power conversion circuit; a second end of the fourth switch element is coupled to the second external connection end; and a second end of the third switch element is grounded.

Based on a composition structure of the power conversion circuit in the eleventh aspect, the power conversion circuit may charge the battery based on a first charging mode, a fifth charging mode, or a sixth charging mode.

In the aforementioned technical solutions, a plurality of different charging triodes can be supported. This can not only meet a battery charging requirement, but also effectively increase a battery charging rate.

According to the first energy storage element and the second energy storage element in the foregoing aspects and implementations, for example, the first energy storage element is a capacitor, and the second energy storage element is an inductor; or the first energy storage element includes at least two capacitors that are connected in parallel, and the second energy storage element includes at least two inductors that are connected in series.

DESCRIPTION OF EMBODIMENTS

The following describes technical solutions of this application with reference to accompanying drawings.

Figure 1:
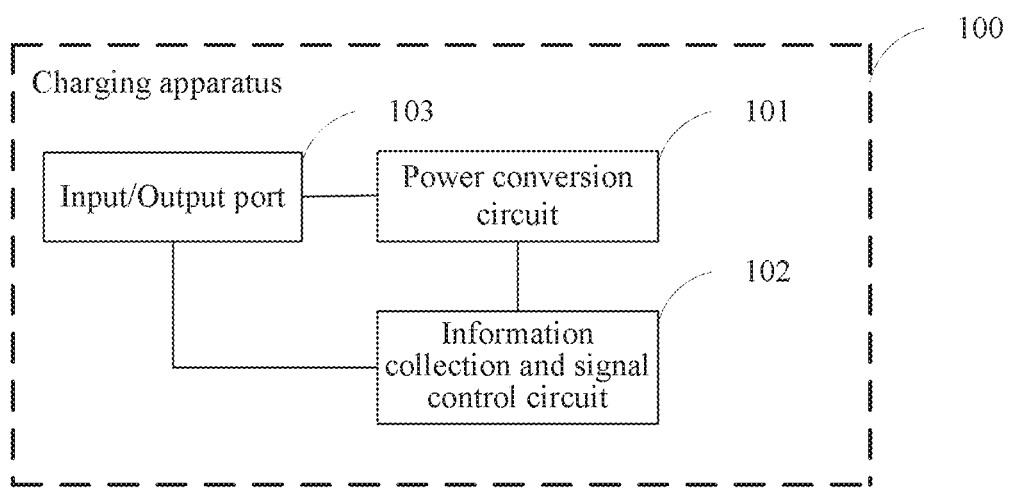
FIG. 1 is a schematic diagram of a charging apparatus according to an embodiment of the present disclosure.

FIG. 1 shows a charging apparatus 100 according to an embodiment of the present disclosure. The charging apparatus 100 may be configured to convert input power energy based on a preset mode and then provide energy for a battery. In FIG. 1, the charging apparatus 100 includes a power conversion circuit 101, an information collection and signal control circuit 102, and an input/output port 103.

Figure 2:
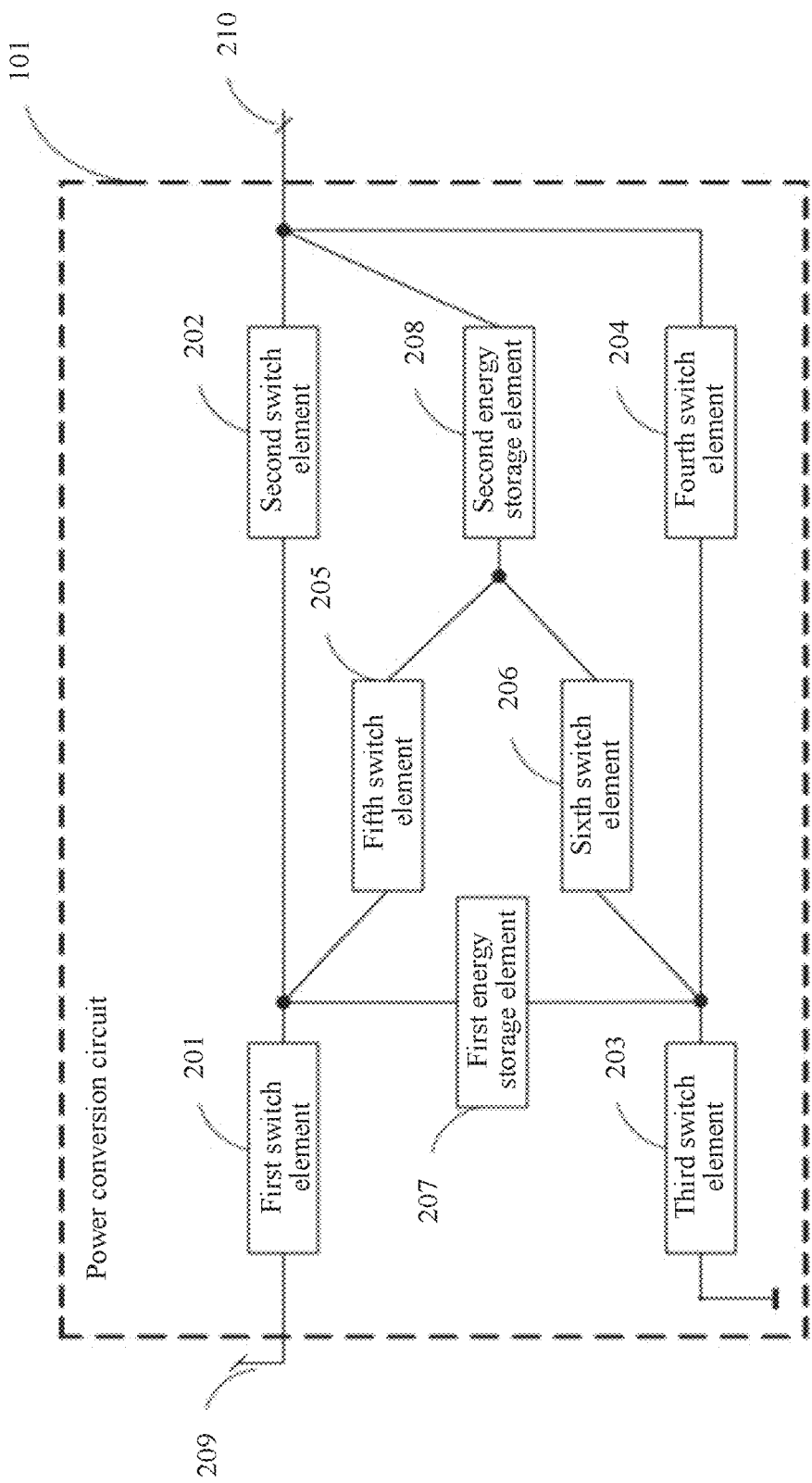
FIG. 2 is a schematic structural diagram of a power conversion circuit according to an embodiment of the present disclosure.

For the power conversion circuit 101 in the charging apparatus 100, FIG. 2 shows a structure of the power conversion circuit according to an embodiment of the present disclosure. In FIG. 2, the power conversion circuit 101 is configured to convert a power supply $V_{BUS}$ into power energy required by a battery. The power conversion circuit 101 includes a first switch element 201, a second switch element 202, a third switch element 203, a fourth switch element 204, a fifth switch element 205, a sixth switch element 206, a first energy storage element 207, and a second energy storage element 208.

In FIG. 2, a first end of the first switch element 201 is coupled and connected to the power supply $V_{BUS}$ through a first external connection end 209 of the power conversion circuit 101; a second end of the first switch element 201 is separately coupled to a first end of the first energy storage element 207, a first end of the second switch element 202, and a first end of the fifth switch element 205; a second end of the first energy storage element 207 is separately coupled to a first end of the third switch element 203, a first end of the fourth switch element 204, and a first end of the sixth switch element 206; a second end of the second switch element 202 is coupled and connected to a battery through a second external connection end 210 of the power conversion circuit 101; a second end of the fifth switch element 205 is separately coupled to a first end of the second energy storage element 208 and a second end of the sixth switch element 206; a second end of the second energy storage element 208 is coupled to the second external connection end 210; a second end of the fourth switch element 204 is coupled to the second external connection end 210; and a second end of the third switch element 203 is grounded.

Optionally, the first energy storage element 207 and the second energy storage element 208 each may be one or more devices that can store energy and can release the stored energy. For example, the device is a capacitor or an inductor. Optionally, the first energy storage element 207 and the second energy storage element 208 may have different device types. For example, the first energy storage element 207 is a capacitor, and the second energy storage element 208 is an inductor. For another example, the first energy storage element 207 includes at least two capacitors that are connected in parallel, and the second energy storage element 208 includes at least two inductors that are connected in series. A device type, a device quantity, and a device composition form that are included in an energy storage element are not limited in this embodiment of the present disclosure.

Optionally, at least one of the first switch element 201, the second switch element 202, the third switch element 203, the fourth switch element 204, the fifth switch element 205, and the sixth switch element 206 is a metal oxide semiconductor (MOS) field effect transistor or a bipolar junction transistor (BJT). This is not limited in the embodiments of the present disclosure.

Figure 3:
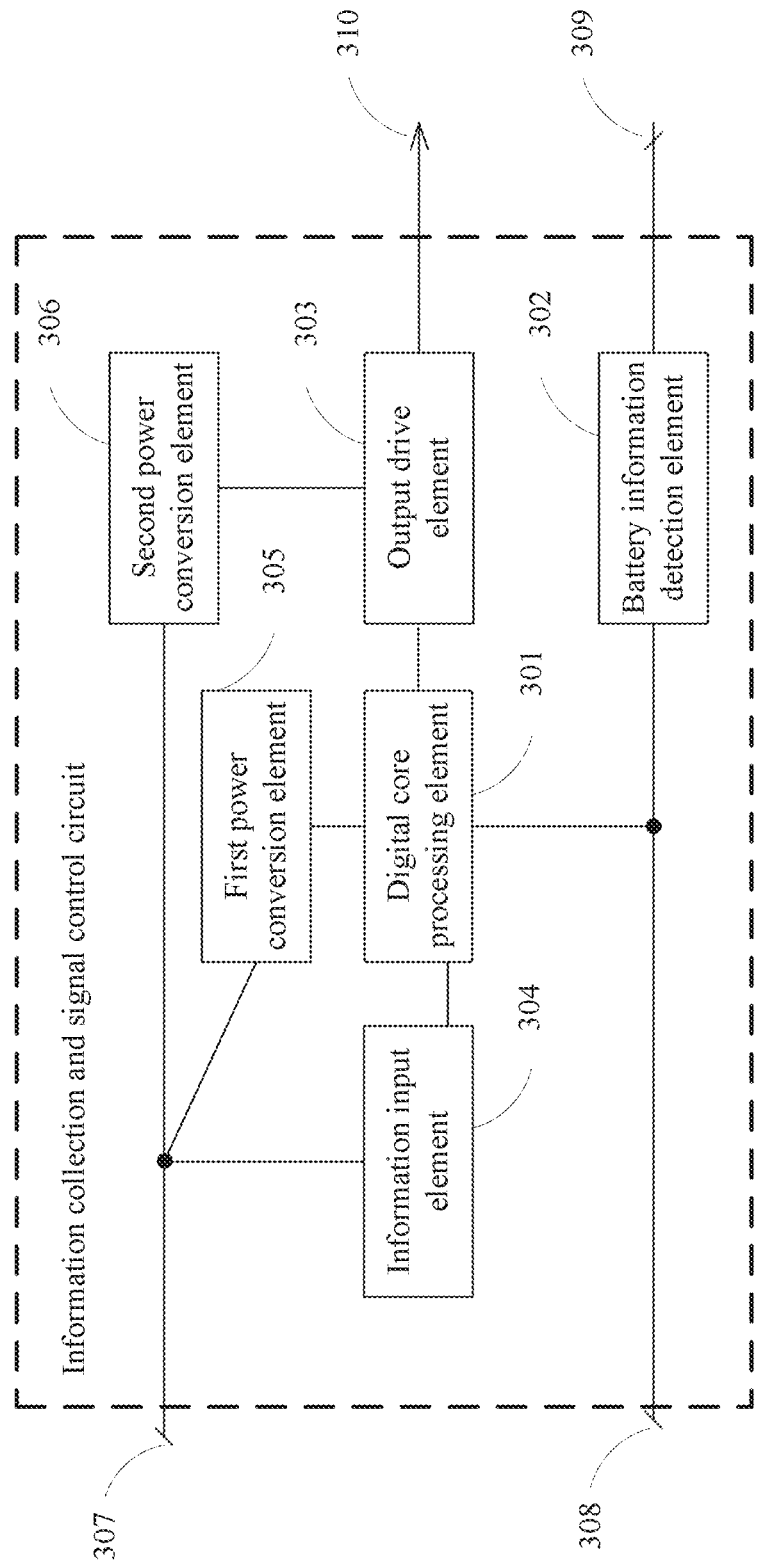
FIG. 3 is a schematic structural diagram of an information collection and signal control circuit according to an embodiment of the present disclosure.

For the information collection and signal control circuit 102 in the charging apparatus 100, FIG. 3 shows a structure of the information collection and signal control circuit according to an embodiment of the present disclosure. In FIG. 3, the information collection and signal control circuit 102 includes a digital core processing element (which may also be expressed as a digital core) 301, a battery information detection element (which may also be expressed as a BAT info DET) 302, an output drive element (which may also be expressed as an output driver) 303, an information input element (which may also be expressed as an INPT info) 304, a first power conversion element (which may also be expressed as an 305, and a second power conversion element (which may also be expressed as an LD) 306.

In FIG. 3, the information input element 304, the first power conversion element 305, and the second power conversion element 306 are separately coupled and connected to a power supply $V_{BUS}$ through a first external connection end 307 of the information collection and signal control circuit 102. The information input element 304 is connected to the digital core processing element 301. The information input element 304 is configured to collect an electrical characteristic of the power supply $V_{BUS}$. For example, the electrical characteristic may be voltage and/or current information. Then the information input element 304 transfers the collected electrical characteristic to the digital core processing element 301. The first power conversion element 305 is connected to the digital core processing element 301. The first power conversion element 305 is configured to convert a voltage of the power supply $V_{BUS}$ into a voltage $V_1$ required by the digital core processing element 301. The second power conversion element 306 is connected to the output drive element 303. The second power conversion element 306 is configured to convert a voltage of the power supply $V_{BUS}$ into a voltage $V_2$ required by the output drive element 303. The digital core processing element 301 is coupled and connected to a data line of a power adapter through a second external connection end 308 of the information collection and signal control circuit 102, and implements data communication by reading a D+/D− high/low level. For example, the communication is protocol-based handshaking between the power adapter and the charging apparatus, or is adjusting a voltage of the power supply $V_{BUS}$. The digital core processing element 301 is further connected to the battery information detection element 302, and the battery information detection element 302 is coupled and connected to a battery through a third external connection end 309 of the information collection and signal control circuit 102. The battery information detection element 302 is configured to collect battery system information, for example, information about a voltage and a current that can be supported by the battery, or a battery retention capacity (retention capacity). Then the battery information detection element 302 transfers the collected battery system information to the digital core processing element 301. The digital core processing element 301 is further connected to the output drive element 303, for example, is connected through a gate control bus. The digital core processing unit 301 analyzes the electrical characteristic of the power supply $V_{BUS}$ and the battery system information that are collected, generates a time sequence signal according to a service requirement, and then transfers the time sequence signal to the output drive element 303. The service requirement is a charging mode set by the charging apparatus. For example, a charging mode is charging the battery using a relatively large current (for example, 2 A), and another charging mode is charging the battery using a relatively high voltage (for example, 9 volt (V) or 12 V). The time sequence signal is used to control closing or opening of each switch element in the power conversion circuit 101 such that an energy storage element stores and releases energy based on different charging modes. The output drive element 303 is coupled to each switch element in the power conversion circuit 101 through a fourth external connection end 310 of the information collection and signal control circuit 102. The output drive element 303 is configured to convert a digital signal transferred by the digital core processing element 301 into an analog signal. Then each switch element in the power conversion circuit 101 is closed or opened based on the analog signal such that the charging apparatus charges the battery according to the service requirement.

Optionally, the battery information detection element 302 and the information input element 304 may periodically collect information, or may dynamically collect information according to a charging requirement. This is not limited in this embodiment of the present disclosure.

Figure 4:
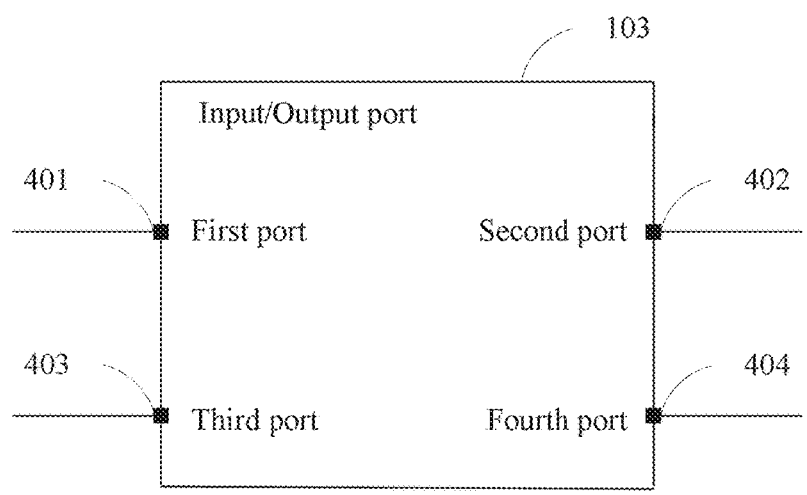
FIG. 4 is a schematic structural diagram of an input/output port according to an embodiment of the present disclosure.

For the input/output port 103 in the charging apparatus 100, FIG. 4 shows a structure of the input/output port according to an embodiment of the present disclosure. In FIG. 4, the input/output port 103 is a USB port (which may also be expressed as a USB port), and belongs to serial communications. Further, a first end 401 of the USB port is connected to a power supply $V_{BUS}$ of a power adapter, and a second end 402 of the USB port is separately coupled to a first external connection end 209 of the power conversion circuit 101 and a first external connection end 307 of the information collection and signal control circuit 102. The second end 402 transfers energy of the power supply $V_{BUS}$ to the power conversion circuit 101 and the information collection and signal control circuit 102. A third end 403 of the USB port is connected to a data line of the power adapter. A fourth end 404 of the USB port is coupled to a second external connection end 308 of the information collection and signal control circuit 102. The fourth end 404 transfers a high or low level to implement data reading and writing for the information collection and signal control circuit 102.

Figure 5:
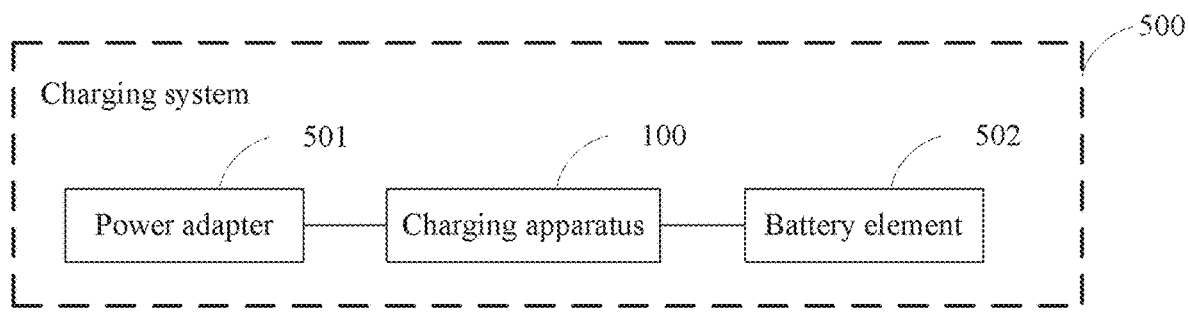
FIG. 5 is a schematic diagram of a charging system according to an embodiment of the present disclosure.

With reference to the descriptions of the charging apparatus in FIG. 1 to FIG. 4, FIG. 5 shows a charging system 500 according to an embodiment of the present disclosure. In FIG. 5, the charging system 500 includes a charging apparatus 100, a power adapter 501, and a battery element 502. One end of the power adapter 501 is connected to an external power supply, and the other end of the power adapter 501 is connected to an input/output port 103 of the charging apparatus 100. The power adapter 501 is configured to convert the external power supply into a power supply $V_{BUS}$ required by the charging apparatus 100. Then energy of the power supply $V_{BUS}$ is output to the charging apparatus 100 through a power cable. Output types may be classified into an alternating-current output type and a direct-current output type. This is not limited in this embodiment of the present disclosure. The power adapter 501 is further configured to implement data communication and exchange with the charging apparatus 100 through a data line. The charging apparatus 100 may be an independent apparatus, or may be disposed inside a device, where the device may be a device such as a terminal, a base station, or an electric vehicle. The terminal may be a mobile phone (also referred to as a smartphone), a tablet computer, a personal digital assistant (PDA), an electronic book reader (e-book reader), a wearable device, or the like. The base station may include a macro base station, a micro base station (also referred to as a small cell), a relay station, an access point, or the like in various forms. The charging apparatus 100 is connected to the battery element 502, and is configured to charge a battery using obtained energy. Optionally, the device may further include the battery element 502, and the battery element 502 may include one or more batteries. If the battery element 502 includes a plurality of batteries, the plurality of batteries may be connected in series or in parallel. This is not limited in this embodiment of the present disclosure.

It should be noted that some constituent parts included in the charging apparatus and the charging system in this application are expressed as "xx elements". This expression presents each constituent part from a perspective of a function, but does not limit an implementation form of the constituent part. For example, each constituent part may be implemented by a physical device, or a chip, or a circuit or an integrated circuit. This is not limited in this embodiment of the present disclosure.

The power conversion circuit in FIG. 2 includes at least six switch elements. A composition structure of the power conversion circuit enables the charging apparatus to support battery charging in different charging modes. The following describes the technical solutions provided in the embodiments of the present disclosure using different charging modes as examples and with reference to the foregoing descriptions of the charging apparatus.

Figure 6:
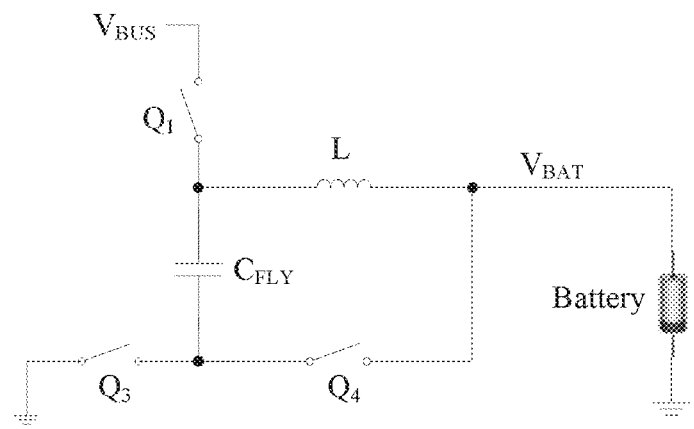
FIG. 6 is a schematic structural diagram of an effective operating circuit of a power conversion circuit in a first charging mode according to an embodiment of the present disclosure.

Optionally, in a first charging mode, the power conversion circuit is configured to charge the battery in a low-voltage large-current mode. Based on this mode, with reference to FIG. 2, the second switch element and the sixth switch element in the power conversion circuit are always kept open, and the fifth switch element is always kept closed. For the "kept open", because an open switch element has very large impedance, from a perspective of an actual effect, this is similar to that the open switch element is not connected to other elements. For the "kept closed", because a closed switch element has very small impedance, from a perspective of an actual effect, this is similar to that the closed switch element is connected to another element through a conductor. In this case, in the first charging mode, an effective operating circuit structure of the power conversion circuit actually includes the first switch element, the third switch element, the fourth switch element, the first energy storage element, and the second energy storage element. Further, FIG. 6 shows the effective operating circuit structure of the power conversion circuit in the first charging mode according to an embodiment of the present disclosure. In FIG. 6, the first switch element is denoted as $Q_1$, the third switch element is denoted as $Q_3$, the fourth switch element is denoted as $Q_4$, the first energy storage element is a capacitor $C_{FLY}$, and the second energy storage element is an inductor L. In the power conversion circuit, a first end of the capacitor $C_{FLY}$ is connected to a power supply $V_{BUS}$ through the switch element $Q_1$, the first end of the capacitor $C_{FLY}$ is further connected to the inductor L, a second end of the capacitor $C_{FLY}$ is grounded through the switch element $Q_3$, the second end of the capacitor $C_{FLY}$ is connected to a second end of the inductor L through the switch element $Q_4$, the second end of the inductor L is coupled and connected to a positive end of a battery element (a battery shown in FIG. 6), and a negative end of the battery element is grounded.

Figure 7:
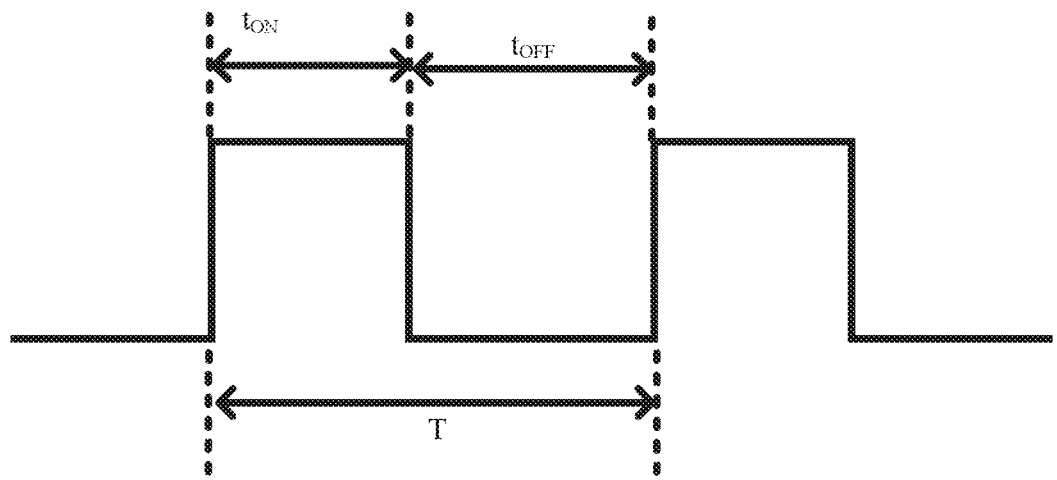
FIG. 7 is a schematic diagram of a control signal time sequence of a power conversion circuit according to an embodiment of the present disclosure.

FIG. 7 shows a control signal time sequence of the power conversion circuit according to an embodiment of the present disclosure. In FIG. 7, a complete control signal period T includes two time periods a first time period $t_{ON}$ and a second time period $t_{OFF}$. In the first time period $t_{ON}$, the switch element $Q_1$ and the switch element $Q_4$ are in a closed state, the switch element $Q_3$ is in an open state, the input power supply $V_{BUS}$ is connected to the capacitor $C_{FLY}$ and then connected to a battery $V_{BAT}$, and the input power supply $V_{BUS}$ is connected to the inductor L and then connected to the battery $V_{BAT}$. In this case, the capacitor $C_{FLY}$ and the inductor L are in a charging and energy storage state. In the second time period $t_{OFF}$ after the first time period $t_{ON}$, the switch element $Q_1$ and the switch element $Q_4$ are in an open state, the switch element $Q_3$ is in a closed state, a lower plate of the capacitor $C_{FLY}$ is grounded through the switch element $Q_3$, and a voltage of an upper plate of the capacitor $C_{FLY}$ is $V_{BUS}-V_{BAT}$. In this case, the capacitor $C_{FLY}$ and the inductor L are in a discharging state, and charge the battery element.

The first charging mode is usually applicable to a case in which a power adapter supports a 5 V/2 A power supply. The charging apparatus charges the battery in the first charging mode using the power conversion circuit. A charging voltage of the battery is $V_{BUS}-V_{BAT}$, and the voltage is not high (for example, 5 V). An energy loss of an inductive winding in the circuit is relatively low, and an energy loss at a junction between the capacitor $C_{FLY}$ and the inductor L is relatively low such that an overall energy loss of the power conversion circuit is relatively low when the power conversion circuit is charging the battery. When an energy loss is low, a current input to the battery increases (for example, 2 A), thereby effectively increasing a battery charging rate.

Figure 8:
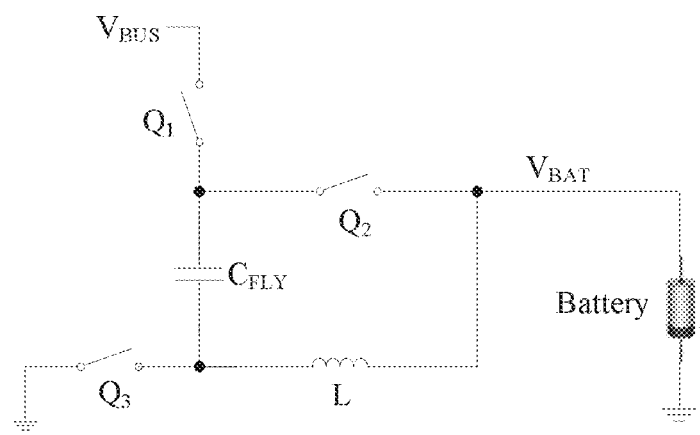
FIG. 8 is a schematic structural diagram of an effective operating circuit of a power conversion circuit in a second charging mode according to an embodiment of the present disclosure.

Optionally, in a second charging mode, the power conversion circuit is configured to charge the battery in a high-voltage large-current mode. Based on this mode, with reference to FIG. 2, the fourth switch element and the fifth switch element in the power conversion circuit are always kept open, and the sixth switch element is always kept closed. In this case, in the second charging mode, an effective operating circuit structure of the power conversion circuit actually includes the first switch element, the second switch element, the third switch element, the first energy storage element, and the second energy storage element. Further, FIG. 8 shows the effective operating circuit structure of the power conversion circuit in the second charging mode according to an embodiment of the present disclosure. In FIG. 8, the first switch element is denoted as $Q_1$, the second switch element is denoted as $Q_2$, the third switch element is denoted as $Q_3$, the first energy storage element is a capacitor $C_{FLY}$, and the second energy storage element is an inductor L. In the power conversion circuit, a first end of the capacitor $C_{FLY}$ is connected to a power supply $V_{BUS}$ through the switch element $Q_1$, the first end of the capacitor $C_{FLY}$ is further coupled and connected to a positive end of a battery element (a battery shown in FIG. 8) through the switch element $Q_2$, a second end of the capacitor $C_{FLY}$ is grounded through the switch element $Q_3$, the second end of the capacitor $C_{FLY}$ is coupled to a first end of the inductor L, a second end of the inductor L is coupled and connected to the positive end of the battery element, and a negative end of the battery element is grounded.

With reference to FIG. 7, in the first time period $t_{ON}$, the switch element $Q_1$ is in a closed state, the switch element $Q_2$ and the switch element $Q_3$ are in an open state, the input power supply $V_{BUS}$ is connected to the capacitor $C_{FLY}$, then connected to the inductor L, and then connected to a battery $V_{BAT}$, and the capacitor $C_{FLY}$ and the inductor L are connected in series. In this case, the capacitor $C_{FLY}$ and the inductor L are in a charging and energy storage state. In the second time period $t_{OFF}$ after the first time period $t_{ON}$, the switch element $Q_1$ is in an open state, the switch element $Q_2$ and the switch element $Q_3$ are in a closed state, both a lower plate of the capacitor $C_{FLY}$ and a first end of the inductor L are grounded, both an upper plate of the capacitor $C_{FLY}$ and a second end of the inductor L are connected to the battery $V_{BAT}$, and the capacitor $C_{FLY}$ and the inductor L are connected in parallel. In this case, the capacitor $C_{FLY}$ and the inductor L are in a discharging state, and charge the battery element.

The second charging mode is usually applicable to a case in which a power adapter supports a voltage of 9 V or 12 V. The charging apparatus charges the battery in the second charging mode using the power conversion circuit. A charging voltage of the battery is a difference between voltages at two ends of a combination of the capacitor $C_{FLY}$ and the inductor L, and usually, the charging voltage is relatively high (for example, 9 V or 12 V). An energy loss of an inductive winding in the circuit is relatively low, and an energy loss at a junction between the capacitor $C_{FLY}$ and the inductor L is relatively low such that an overall energy loss of the power conversion circuit is relatively low when the power conversion circuit is charging the battery. When an energy loss is low, a current input to the battery increases (for example, 2 A), thereby effectively increasing a battery charging rate.

Figure 9:
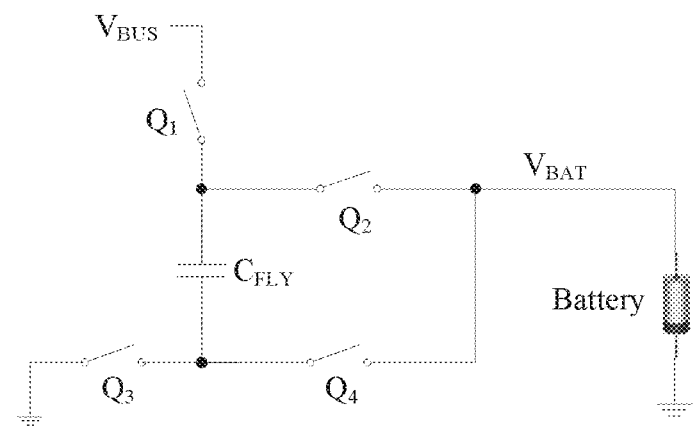
FIG. 9 is a schematic structural diagram of an effective operating circuit of a power conversion circuit in a third charging mode according to an embodiment of the present disclosure.

Optionally, in a third charging mode, the power conversion circuit is configured to charge the battery in a high-voltage direct-charge mode. Based on this mode, with reference to FIG. 2, the fifth switch element and the sixth switch element in the power conversion circuit are always kept open such that the second energy storage element is always in a non-operating state. In this case, in the third charging mode, an effective operating circuit structure of the power conversion circuit actually includes the first switch element, the second switch element, the third switch element, the fourth switch element, and the first energy storage element. Further, FIG. 9 shows a structure of the power conversion circuit based on the third charging mode according to an embodiment of the present disclosure. In FIG. 9, the first switch element is denoted as $Q_1$, the second switch element is denoted as $Q_2$, the third switch element is denoted as $Q_3$, the fourth switch element is denoted as $Q_4$, and the first energy storage element is a capacitor $C_{FLY}$. In the power conversion circuit, a first end of the capacitor $C_{FLY}$ is connected to a power supply $V_{BUS}$ through the switch element $Q_1$, the first end of the capacitor $C_{FLY}$ is further coupled and connected to a positive end of a battery element (a battery shown in FIG. 9) through the switch element $Q_2$, a second end of the capacitor $C_{FLY}$ is grounded through the switch element $Q_3$, the second end of the capacitor $C_{FLY}$ is further coupled and connected to the positive end of the battery element through the switch element $Q_4$, and a negative end of the battery element is grounded.

With reference to FIG. 7, in the first time period $t_{ON}$, the switch element $Q_1$ and the switch element $Q_4$ are in a closed state, the switch element $Q_2$ and the switch element $Q_3$ are in an open state, and the input power supply $V_{BUS}$ is connected to the capacitor $C_{FLY}$ and then connected to a battery $V_{BAT}$. In this case, the capacitor $C_{FLY}$ is in a charging and energy storage state. In the second time period $t_{OFF}$ after the first time period $t_{ON}$, the switch element $Q_1$ and the switch element $Q_4$ are in an open state, the switch element $Q_2$ and the switch element $Q_3$ are in a closed state, a lower plate of the capacitor $C_{FLY}$ is grounded, and an upper plate of the capacitor $C_{FLY}$ is connected to the battery $V_{BAT}$. In this case, the capacitor $C_{FLY}$ is in a discharging state, and charges the battery element.

The charging apparatus charges the battery in the third charging mode using the power conversion circuit. In the first time period $t_{ON}$, two ends of the capacitor $C_{FLY}$ are separately directly connected to the power supply $V_{BUS}$ and the battery $V_{BAT}$; and in the second time period $t_{OFF}$, a charging voltage of the battery is a difference between voltages at two ends of the capacitor $C_{FLY}$. Therefore, this direct-charge and direct-discharge mode of the charging circuit leads to very high battery charging efficiency.

The third charging mode is usually applicable to a case in which a power adapter supports a relatively high voltage (for example, 9 V or 12 V). The charging apparatus charges the battery in the third charging mode using the power conversion circuit. The charging voltage of the battery is the difference between the voltages at the two ends of the capacitor $C_{FLY}$. Because the input power supply $V_{BUS}$ directly charges the capacitor $C_{FLY}$, charging efficiency of the capacitor is relatively high, and energy input to the battery directly sources from charging energy of the capacitor such that a voltage of the input power supply approaches twice a voltage of the battery. In this high-voltage direct-charge case, an energy loss is relatively low, and the battery is likely to be fully charged with electricity fast, thereby effectively increasing a battery charging rate.

Optionally, in a fourth charging mode, the power conversion circuit is configured to charge the battery in a low-voltage direct-charge mode. Based on this mode, with reference to FIG. 2, the fourth switch element, the fifth switch element, and the sixth switch element in the power conversion circuit are always kept open, and the first switch element and the third switch element are always kept closed such that the first energy storage element and the second energy storage element are always in a non-operating state. In this case, in the power conversion circuit, one end of the second switch element is coupled and connected to a power supply $V_{BUS}$, the other end of the second switch element is coupled and connected to a positive end of a battery, and a negative end of a battery element is grounded.

With reference to FIG. 7, in the first time period $t_{ON}$, the second switch element is in a closed state, and the input power supply $V_{BUS}$ is connected to a battery $V_{BAT}$. In this case, the battery element is directly charged. In the second time period $t_{OFF}$, the second switch element is in an open state, and charging of the battery element is suspended.

The fourth charging mode is usually applicable to a case in which a power adapter supports a relatively low voltage (for example, 3 V or 5 V). In the fourth charging mode, the charging apparatus directly charges the battery with power energy through closing and opening of the second switch element in the power conversion circuit. In this low-voltage direct-charge case, an energy loss is relatively low, and the battery is likely to be fully charged with electricity fast, thereby effectively increasing a battery charging rate.

Figure 10:
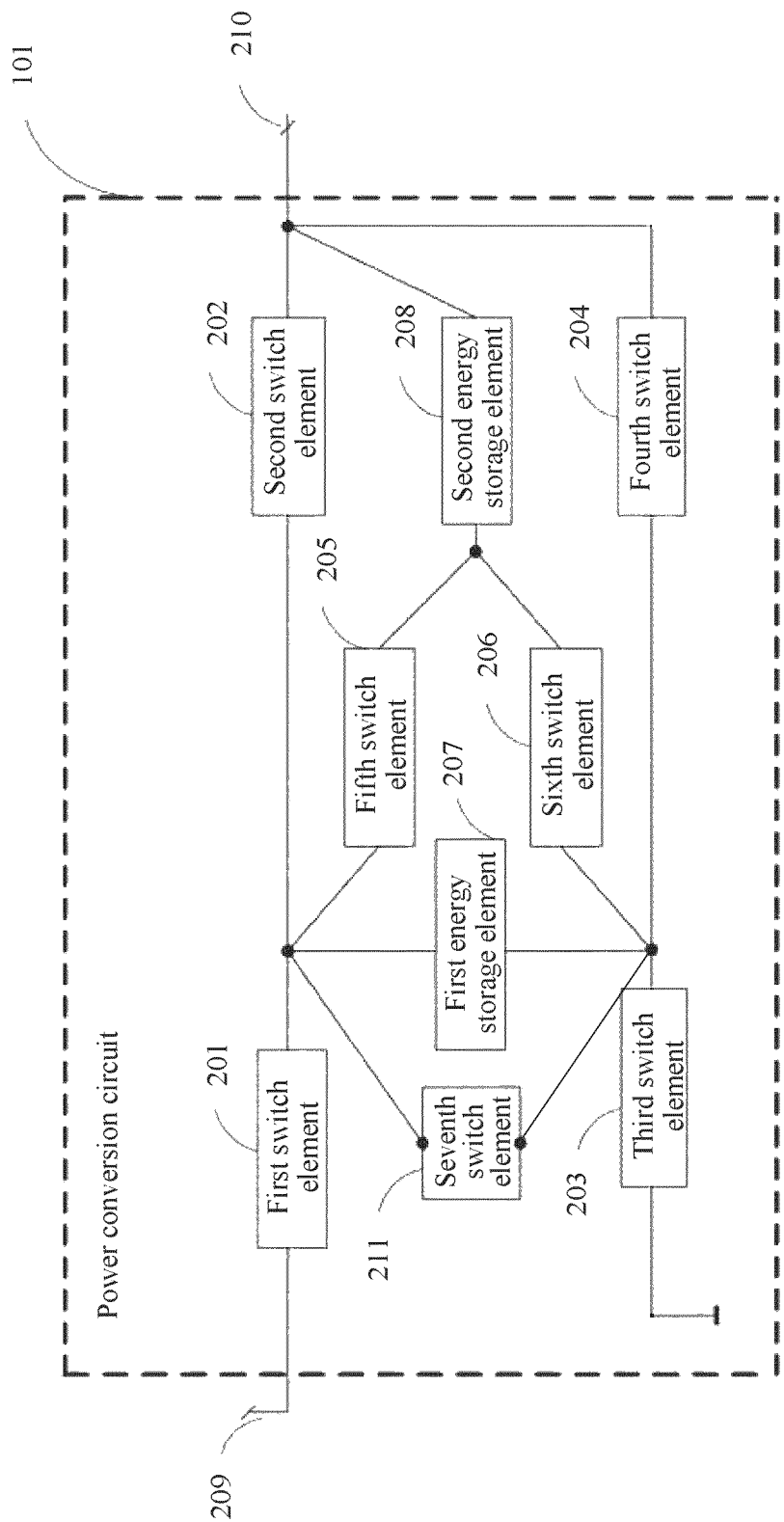
FIG. 10 is another schematic structural diagram of a power conversion circuit according to an embodiment of the present disclosure.

For the power conversion circuit 101 in the charging apparatus 100, FIG. 10 shows another structure of the power conversion circuit according to an embodiment of the present disclosure. In FIG. 10, the power conversion circuit 101 is configured to convert a power supply $V_{BUS}$ into power energy required by a battery. Compared with FIG. 2, a difference lies in that the power conversion circuit 101 further includes a seventh switch element 211. A first end of the seventh switch element 211 is separately coupled to the second end of the first switch element 201, the first end of the second switch element 202, the first end of the fifth switch element 205, and the first end of the first energy storage element 207. A second end of the seventh switch element 211 is separately coupled to the first end of the third switch element 203, the first end of the fourth switch element 204, the first end of the sixth switch element 206, and the second end of the first energy storage element 207.

The power conversion circuit in FIG. 10 includes at least seven switch elements. A composition structure of the power conversion circuit enables the charging apparatus to support not only the foregoing four charging modes but also other charging modes in order to charge the battery.

Figure 11:
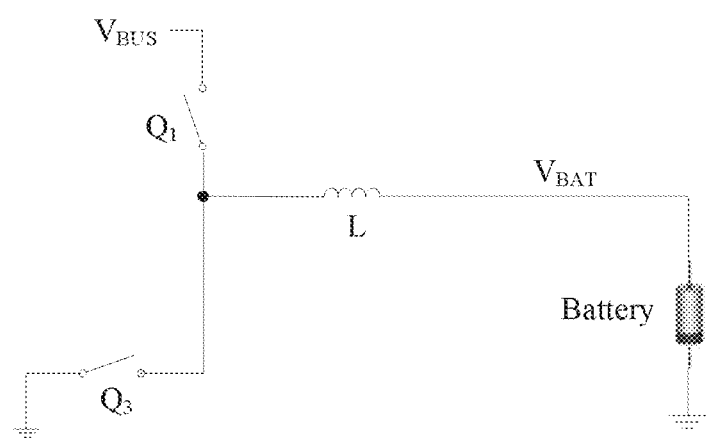
FIG. 11 is a schematic structural diagram of an effective operating circuit of a power conversion circuit in a fifth charging mode or a sixth charging mode according to an embodiment of the present disclosure.

Optionally, in a fifth charging mode or a sixth charging mode, the power conversion circuit charges the battery in a conventional mode. In the two modes, the power conversion circuit is similar to a typical BUCK circuit, and is usually applicable to a case in which a power adapter supports a voltage of 5 V, 9 V, or 12 V. Based on the fifth charging mode or the sixth charging mode, with reference to FIG. 10, in the fifth charging mode, the second switch element, the fourth switch element, and the sixth switch element in the power conversion circuit are always kept open, and the fifth switch element and the seventh switch element are always kept closed; and in the sixth charging mode, the second switch element, the fourth switch element, and the fifth switch element in the power conversion circuit are always kept open, and the sixth switch element and the seventh switch element are always kept closed. The seventh switch element is always kept closed such that the first energy storage element is short-circuited and is in a non-operating state. In this case, in the fifth charging mode or the sixth charging mode, an effective operating circuit structure of the power conversion circuit includes the first switch element, the third switch element, and the second energy storage element. Further, FIG. 11 shows the effective operating circuit structure of the power conversion circuit in the fifth charging mode or the sixth charging mode according to an embodiment of the present disclosure. In FIG. 11, the first switch element is denoted as $Q_1$, the third switch element is denoted as $Q_3$, and the second energy storage element is an inductor L. In the power conversion circuit, a first end of the inductor L is connected to a power supply $V_{BUS}$ through the switch element $Q_1$, the first end of the inductor L is further grounded through the switch element $Q_3$, a second end of the inductor L is coupled and connected to a positive end of a battery element (a battery shown in FIG. 11), and a negative end of the battery element is grounded.

With reference to FIG. 7, in the first time period $t_{ON}$, the switch element $Q_1$ is in a closed state, the switch element $Q_3$ is in an open state, and the input power supply $V_{BUS}$ is connected to the inductor L and then connected to a battery $V_{BAT}$. In this case, the inductor L is in a charging and energy storage state. In the second time period $t_{OFF}$, the switch element $Q_1$ is in an open state, the switch element $Q_3$ is in a closed state, and the inductor L is in a discharging state, and charges the battery element.

It should be noted that the six switch elements or the seven switch elements, the first energy storage element, and the second energy storage element are not a mandatory composition structure of the power conversion circuit. An element quantity and a composition structure of the power conversion circuit may be pre-adjusted based on a supported charging mode. The following provides example descriptions with reference to the accompanying drawings. This is not limited in the embodiments of the present disclosure.

Figure 12:
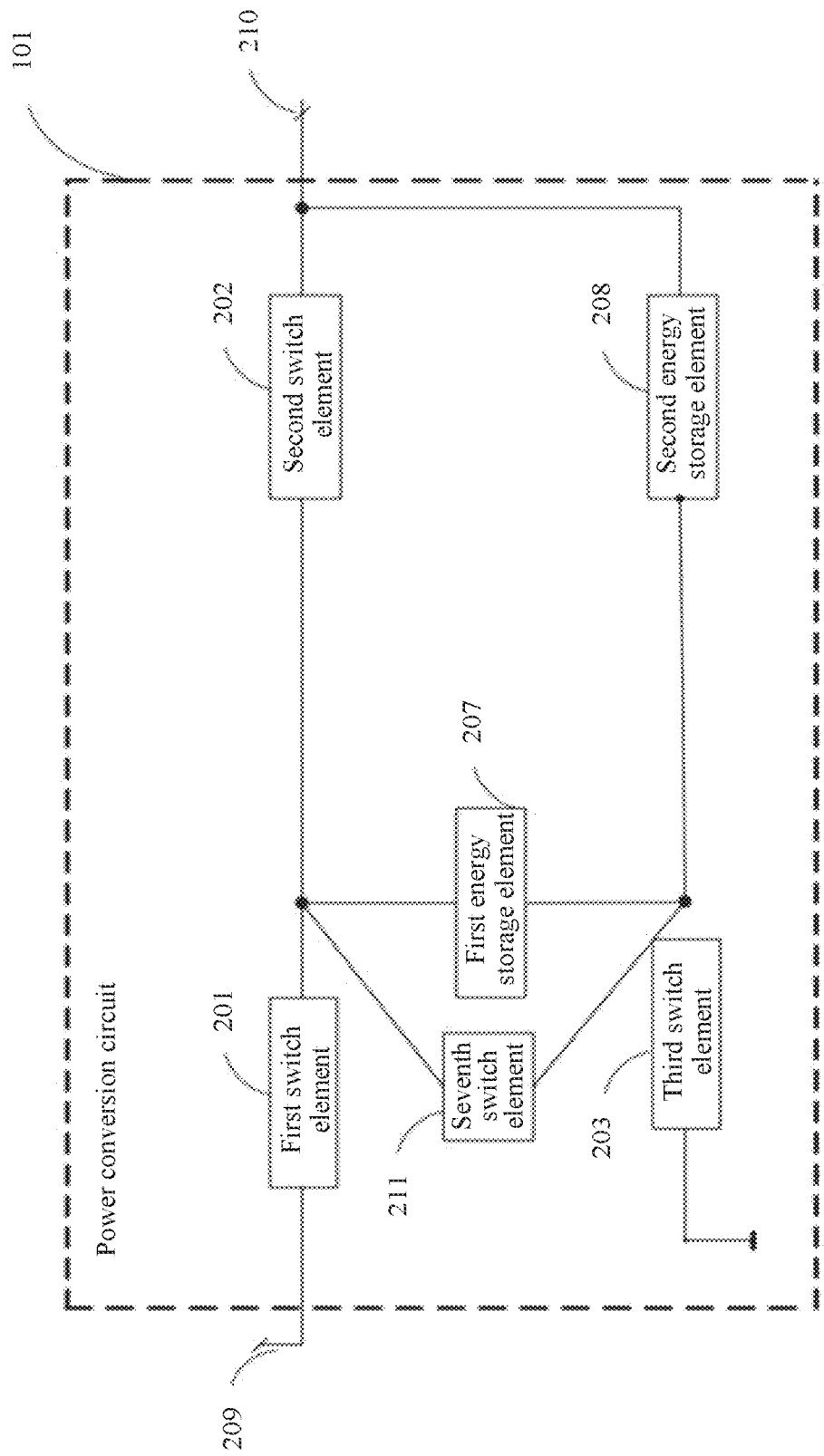
FIG. 12 is another schematic structural diagram of a power conversion circuit according to an embodiment of the present disclosure.

For example, FIG. 12 shows another structure of a power conversion circuit according to an embodiment of the present disclosure. In FIG. 12, the power conversion circuit 101 includes a first switch element 201, a second switch element 202, a third switch element 203, a seventh switch element 211, a first energy storage element 207, and a second energy storage element 208. A first end of the first switch element 201 is coupled and connected to an input power supply through a first external connection end 209 of the power conversion circuit. A second end of the first switch element 201 is separately coupled to a first end of the second switch element 202, a first end of the seventh switch element 211, and a first end of the first energy storage element 207. A second end of the first energy storage element 207 is separately coupled to a first end of the second energy storage element 208, a first end of the third switch element 203, and a second end of the seventh switch element 211. A second end of the second switch element 202 is coupled and connected to a battery through a second external connection end 210 of the power conversion circuit. A second end of the second energy storage element 208 is coupled to the second external connection end 210. A second end of the third switch element 203 is grounded.

Based on a composition structure of the power conversion circuit shown in FIG. 12, the power conversion circuit 101 may charge the battery based on a second charging mode or a sixth charging mode. Further, in the second charging mode, in the power conversion circuit 101, the seventh switch element 211 is kept open; in a first time period, the first switch element 201 is in a closed state, the second switch element 202 and the third switch element 203 are in an open state, and the first energy storage element 207 and the second energy storage element 208 are charged; and in a second time period after the first time period, the first switch element 201 is in an open state, the second switch element 202 and the third switch element 203 are in a closed state, and the first energy storage element 207 and the second energy storage element 208 are discharged. In the sixth charging mode, in the power conversion circuit 101, the second switch element 202 is kept open, and the seventh switch element 211 is kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

Figure 13:
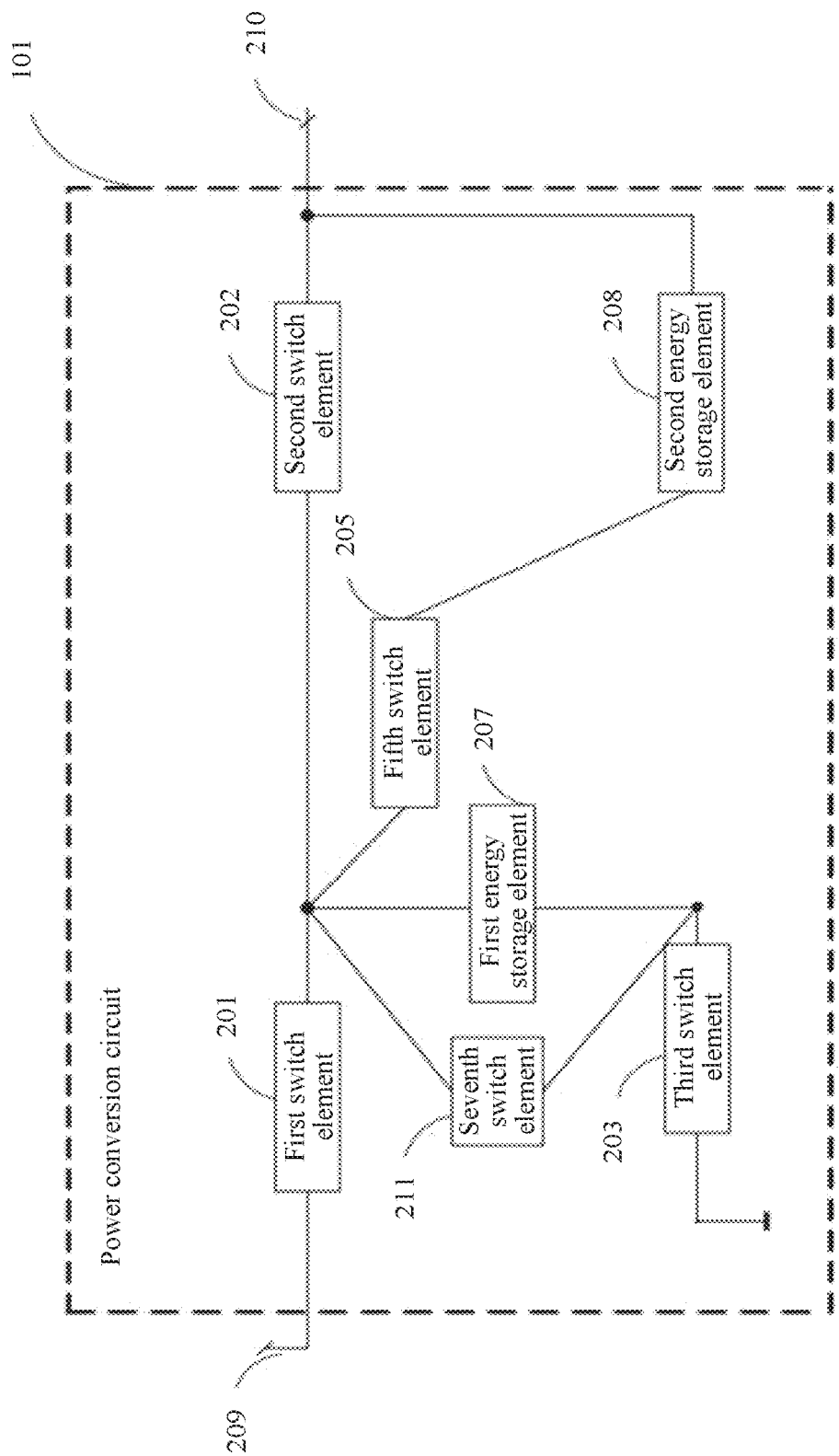
FIG. 13 is another schematic structural diagram of a power conversion circuit according to an embodiment of the present disclosure.

For example, FIG. 13 shows another structure of a power conversion circuit according to an embodiment of the present disclosure. In FIG. 13, the power conversion circuit 101 includes a first switch element 201, a second switch element 202, a third switch element 203, a fifth switch element 205, a seventh switch element 211, a first energy storage element 207, and a second energy storage element 208. A first end of the first switch element 201 is coupled and connected to an input power supply through a first external connection end 209 of the power conversion circuit 101. A second end of the first switch element 201 is separately coupled to a first end of the second switch element 202, a first end of the fifth switch element 205, a first end of the seventh switch element 211, and a first end of the first energy storage element 207. A second end of the first energy storage element 207 is separately coupled to a first end of the third switch element 203 and a second end of the seventh switch element 211. A second end of the second switch element 202 is coupled and connected to a battery through a second external connection end 210 of the power conversion circuit 101. A second end of the fifth switch element 205 is connected to a first end of the second energy storage element 208. A second end of the second energy storage element 208 is coupled to the second external connection end 210. A second end of the third switch element 203 is grounded.

Based on a composition structure of the power conversion circuit shown in FIG. 13, the power conversion circuit may charge the battery based on a second charging mode, a fourth charging mode, a fifth charging mode, or a sixth charging mode. Further, in the second charging mode, in the power conversion circuit 101, the fifth switch element 205 and the seventh switch element 211 are kept open; in a first time period, the first switch element 201 is in a closed state, the second switch element 202 and the third switch element 203 are in an open state, and the first energy storage element 207 and the second energy storage element 208 are charged; and in a second time period after the first time period, the first switch element 201 is in an open state, the second switch element 202 and the third switch element 203 are in a closed state, and the first energy storage element 207 and the second energy storage element 208 are discharged. In the fourth charging mode, in the power conversion circuit 101, the fifth switch element 205 and the seventh switch element 211 are kept open, and the first switch element 201 and the third switch element 203 are kept closed; in a first time period, the second switch element 202 is in a closed state, and the battery is directly charged; and in a second time period after the first time period, the second switch element 202 is in an open state, and battery charging is suspended. In the fifth charging mode, in the power conversion circuit 101, the second switch element 202 is kept open, and the fifth switch element 205 and the seventh switch element 211 are kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged. In the sixth charging mode, in the power conversion circuit 101, the second switch element 202 and the fifth switch element 205 are kept open, and the seventh switch element 211 is kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

The power conversion circuit in FIG. 13 further includes a fourth switch element (not shown in the figure). A first end of the fourth switch element is separately coupled to the first end of the third switch element, the second end of the seventh switch element, and the second end of the first energy storage element. A second end of the fourth switch element is coupled to the second external connection end. The power conversion circuit may alternatively charge the battery based on a third charging mode. Further, in the third charging mode, in the power conversion circuit, the fifth switch element is kept open; in a first time period, the first switch element and the fourth switch element are in a closed state, the second switch element and the third switch element are in an open state, and the first energy storage element is charged; and in a second time period after the first time period, the first switch element and the fourth switch element are in an open state, the second switch element and the third switch element are in a closed state, and the first energy storage element is discharged.

Figure 14:
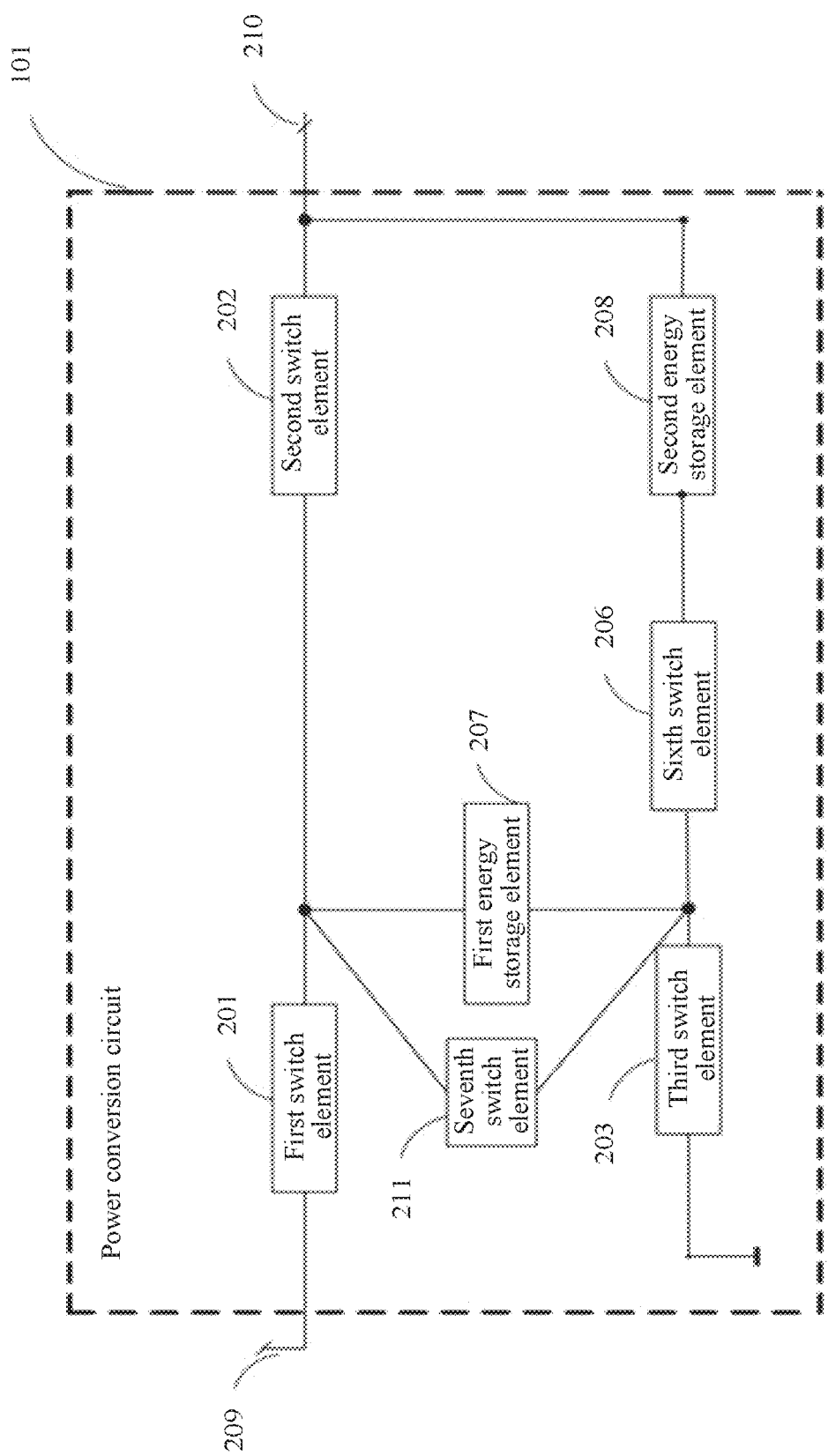
FIG. 14 is another schematic structural diagram of a power conversion circuit according to an embodiment of the present disclosure.

For example, FIG. 14 shows another structure of a power conversion circuit according to an embodiment of the present disclosure. In FIG. 14, the power conversion circuit 101 includes a first switch element 201, a second switch element 202, a third switch element 203, a sixth switch element 206, a seventh switch element 211, a first energy storage element 207, and a second energy storage element 208. A first end of the first switch element 201 is coupled and connected to an input power supply through a first external connection end 209 of the power conversion circuit 101. A second end of the first switch element 201 is separately coupled to a first end of the second switch element 202, a first end of the seventh switch element 211, and a first end of the first energy storage element 207. A second end of the first energy storage element 207 is separately coupled to a first end of the third switch element 203, a first end of the sixth switch element 206, and a second end of the seventh switch element 211. A second end of the second switch element 202 is coupled and connected to a battery through a second external connection end 210 of the power conversion circuit 101. A second end of the sixth switch element 206 is connected to a first end of the second energy storage element 208. A second end of the second energy storage element 208 is coupled to the second external connection end 210. A second end of the third switch element 203 is grounded.

Based on a composition structure of the power conversion circuit shown in FIG. 14, the power conversion circuit may charge the battery based on a second charging mode, a fourth charging mode, or a sixth charging mode. Further, in the second charging mode, in the power conversion circuit 101, the sixth switch element 206 is kept closed; in a first time period, the first switch element 201 is in a closed state, the second switch element 202 and the third switch element 203 are in an open state, and the first energy storage element 207 and the second energy storage element 208 are charged; and in a second time period after the first time period, the first switch element 201 is in an open state, the second switch element 202 and the third switch element 203 are in a closed state, and the first energy storage element 207 and the second energy storage element 208 are discharged. In the fourth charging mode, in the power conversion circuit 101, the sixth switch element 206 is kept open, and the first switch element 201 and the third switch element 203 are kept closed; in a first time period, the second switch element 202 is in a closed state, and the battery is directly charged; and in a second time period after the first time period, the second switch element 202 is in an open state, and battery charging is suspended. In the sixth charging mode, in the power conversion circuit 101, the second switch element 202 is kept open, and the sixth switch element 206 and the seventh switch element 211 are kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

The power conversion circuit in FIG. 14 further includes a fourth switch element (not shown in the figure). A first end of the fourth switch element is separately coupled to the first end of the third switch element, the first end of the sixth switch element, the second end of the seventh switch element, and the second end of the first energy storage element. A second end of the fourth switch element is coupled to the second external connection end. The power conversion circuit may alternatively charge the battery based on a third charging mode. Further, in the third charging mode, in the power conversion circuit, the sixth switch element is kept open; in a first time period, the first switch element and the fourth switch element are in a closed state, the second switch element and the third switch element are in an open state, and the first energy storage element is charged; and in a second time period after the first, time period, the first switch element and the fourth switch element are in an open state, the second switch element and the third switch element are in a closed state, and the first energy storage element is discharged.

Figure 15:
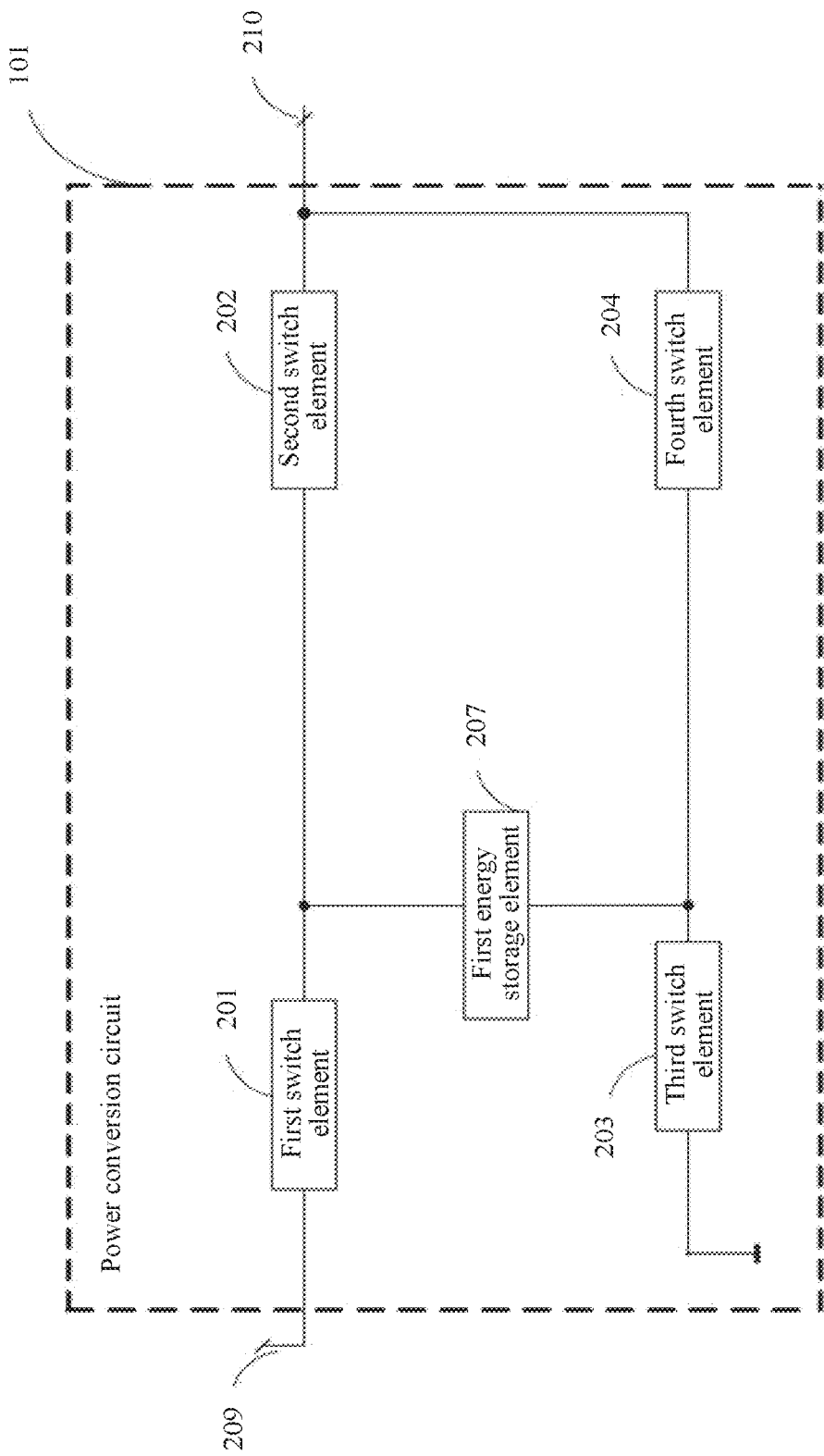
FIG. 15 is another schematic structural diagram of a power conversion circuit according to an embodiment of the present disclosure.

For example, FIG. 15 shows another structure of a power conversion circuit according to an embodiment of the present disclosure. In FIG. 15, the power conversion circuit 101 includes a first switch element 201, a second switch element 202, a third switch element 203, a fourth switch element 204, and a first energy storage element 207. A first end of the first switch element 201 is coupled and connected to an input power supply through a first external connection end 209 of the power conversion circuit 101. A second end of the first switch element 201 is separately coupled to a first end of the second switch element 202 and a first end of the first energy storage element 207. A second end of the first energy storage element 207 is separately coupled to a first end of the third switch element 203 and a first end of the fourth switch element 204. A second end of the second switch element 202 is coupled and connected to a battery through a second external connection end 210 of the power conversion circuit 101. A second end of the fourth switch element 204 is coupled to the second external connection end 210. A second end of the third switch element 203 is grounded.

Based on a composition structure of the power conversion circuit shown in FIG. 15, the power conversion circuit may charge the battery based on a third charging mode or a fourth charging mode. Further, in the third charging mode, in the power conversion circuit 101, in a first time period, the first switch element 201 and the fourth switch element 204 are in a closed state, the second switch element 202 and the third switch element 203 are in an open state, and the first energy storage element 207 is charged; and in a second time period after the first time period, the first switch element 201 and the fourth switch element 204 are in an open state, the second switch element 202 and the third switch element 203 are in a closed state, and the first energy storage element 207 is discharged.

The power conversion circuit in FIG. 15 further includes a fifth switch element and a second energy storage element (not shown in the figure). A first end of the fifth switch element is separately coupled to the second end of the first switch element, the first end of the second switch element, and the first end of the first energy storage element. A second end of the fifth switch element is connected to a first end of the second energy storage element. A second end of the second energy storage element is coupled to the second external connection end. The power conversion circuit may alternatively charge the battery based on a first charging mode. Further, in the first charging mode, in the power conversion circuit, the second switch element is kept open, and the fifth switch element is kept closed; in a first time period, the first switch element and the fourth switch element are in a closed state, the third switch element is in an open state, and the first energy storage element and the second energy storage element are charged; and in a second time period after the first time period, the first switch element and the fourth switch element are in an open state, the third switch element is in a closed state, and the first energy storage element and the second energy storage element are discharged.

Figure 16:
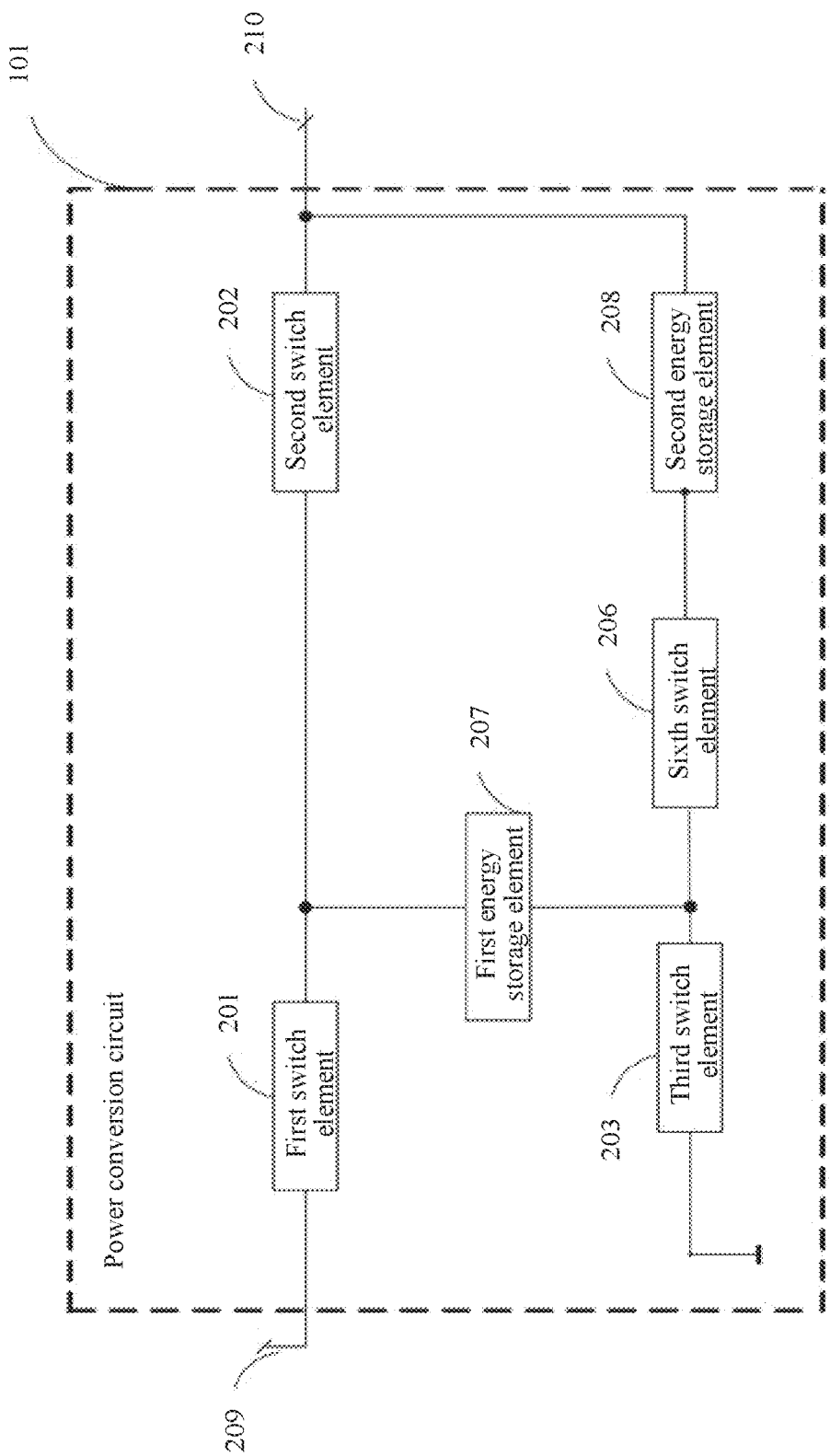
FIG. 16 is another schematic structural diagram of a power conversion circuit according to an embodiment of the present disclosure.

For example, FIG. 16 shows another structure of a power conversion circuit according to an embodiment of the present disclosure. In FIG. 16, the power conversion circuit 101 includes a first switch element 201, a second switch element 202, a third switch element 203, a sixth switch element 206, a first energy storage element 207, and a second energy storage element 208. A first end of the first switch element 201 is coupled and connected to an input power supply through a first external connection end 209 of the power conversion circuit 101. A second end of the first switch element 201 is separately coupled to a first end of the second switch element 202 and a first end of the first energy storage element 207. A second end of the first energy storage element 207 is separately coupled to a first end of the third switch element 203 and a first end of the sixth switch element 206. A second end of the second switch element 202 is coupled and connected to a battery through a second external connection end 210 of the power conversion circuit 101. A second end of the sixth switch element 206 is connected to a first end of the second energy storage element 208. A second end of the second energy storage element 208 is coupled to the second external connection end 210. A second end of the third switch element 203 is grounded.

Based on a composition structure of the power conversion circuit shown in FIG. 16, the power conversion circuit may charge the battery based on a second charging mode or a fourth charging mode. Further, in the second charging mode, in the power conversion circuit 101, the sixth switch element 206 is kept closed; in a first time period, the first switch element 201 is in a closed state, the second switch element 202 and the third switch element 203 are in an open state, and the first energy storage element 207 and the second energy storage element 208 are charged; and in a second time period after the first time period, the first switch element 201 is in an open state, the second switch element 202 and the third switch element 203 are in a closed state, and the first energy storage element 207 and the second energy storage element 208 are discharged. In the fourth charging mode, in the power conversion circuit 101, the sixth switch element 206 is kept open, and the first switch element 201 and the third switch element 203 are kept closed; in a first time period, the second switch element 202 is in a closed state, and the battery is directly charged; and in a second time period after the first time period, the second switch element 202 is in an open state, and battery charging is suspended.

The power conversion circuit in FIG. 16 further includes a fourth switch element (not shown in the figure). A first end of the fourth switch element is separately coupled to the first end of the third switch element, the first end of the sixth switch element, and the second end of the first energy storage element. A second end of the fourth switch element is coupled to the second external connection end. The power conversion circuit may alternatively charge the battery based on a third charging mode. Further, in the third charging mode, in the power conversion circuit, the sixth switch element is kept open; in a first time period, the first switch element and the fourth switch element are in a closed state, the second switch element and the third switch element are in an open state, and the first energy storage element is charged; and in a second time period after the first time period, the first switch element and the fourth switch element are in an open state, the second switch element and the third switch element are in a closed state, and the first energy storage element is discharged.

Figure 17:
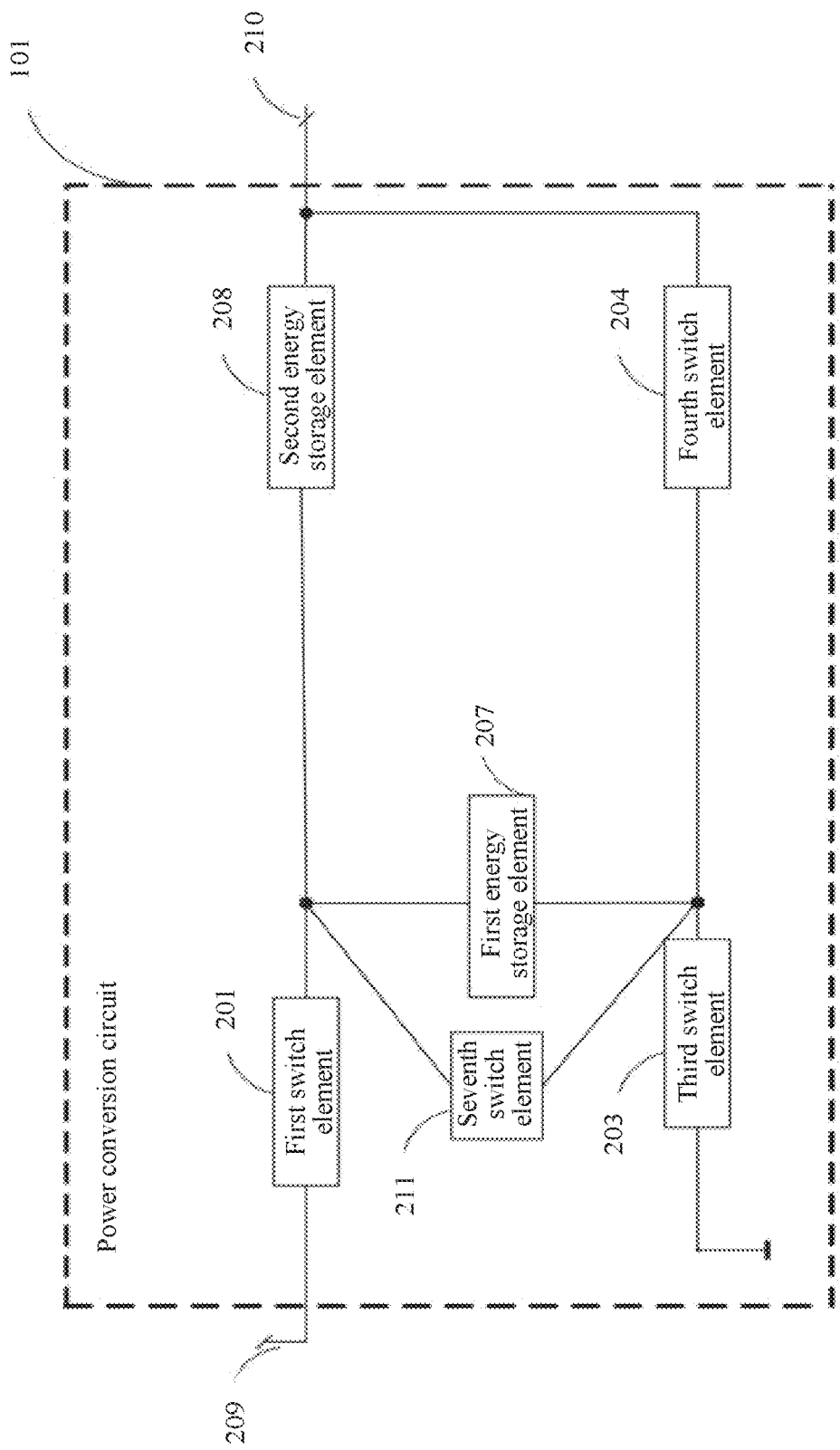
FIG. 17 is another schematic structural diagram of a power conversion circuit according to an embodiment of the present disclosure.

For example, FIG. 17 shows another structure of a power conversion circuit according to an embodiment of the present disclosure. In FIG. 17, the power conversion circuit 101 includes a first switch element 201, a third switch element 203, a fourth switch element 204, a seventh switch element 211, a first energy storage element 207, and a second energy storage element 208. A first end of the first switch element 201 is coupled and connected to an input power supply through a first external connection end 209 of the power conversion circuit 101. A second end of the first switch element 201 is separately coupled to a first end of the seventh switch element 211, a first end of the first energy storage element 207, and a first end of the second energy storage element 208. A second end of the first energy storage element 207 is separately coupled to a first end of the third switch element 203, a first end of the fourth switch element 204, and a second end of the seventh switch element 211. A second end of the second energy storage element 208 is coupled and connected to a battery through a second external connection end 210 of the power conversion circuit 101. A second end of the fourth switch element 204 is coupled to the second external connection end 210. A second end of the third switch element 203 is grounded.

Based on a composition structure of the power conversion circuit shown in FIG. 17, the power conversion circuit may charge the battery based on a first charging mode or a fifth charging mode. Further, in the first charging mode, in the power conversion circuit 101, in a first time period, the first switch element 201 and the fourth switch element 204 are in a closed state, the third switch element 203 is in an open state, and the first energy storage element 207 and the second energy storage element 208 are charged; and in a second time period after the first time period, the first switch element 201 and the fourth switch element 204 are in an open state, the third switch element 203 is in a closed state, and the first energy storage element 207 and the second energy storage element 208 are discharged.

In the fifth charging mode, in the power conversion circuit 101, the fourth switch element 204 is kept open, and the seventh switch element 211 is kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

Figure 18:
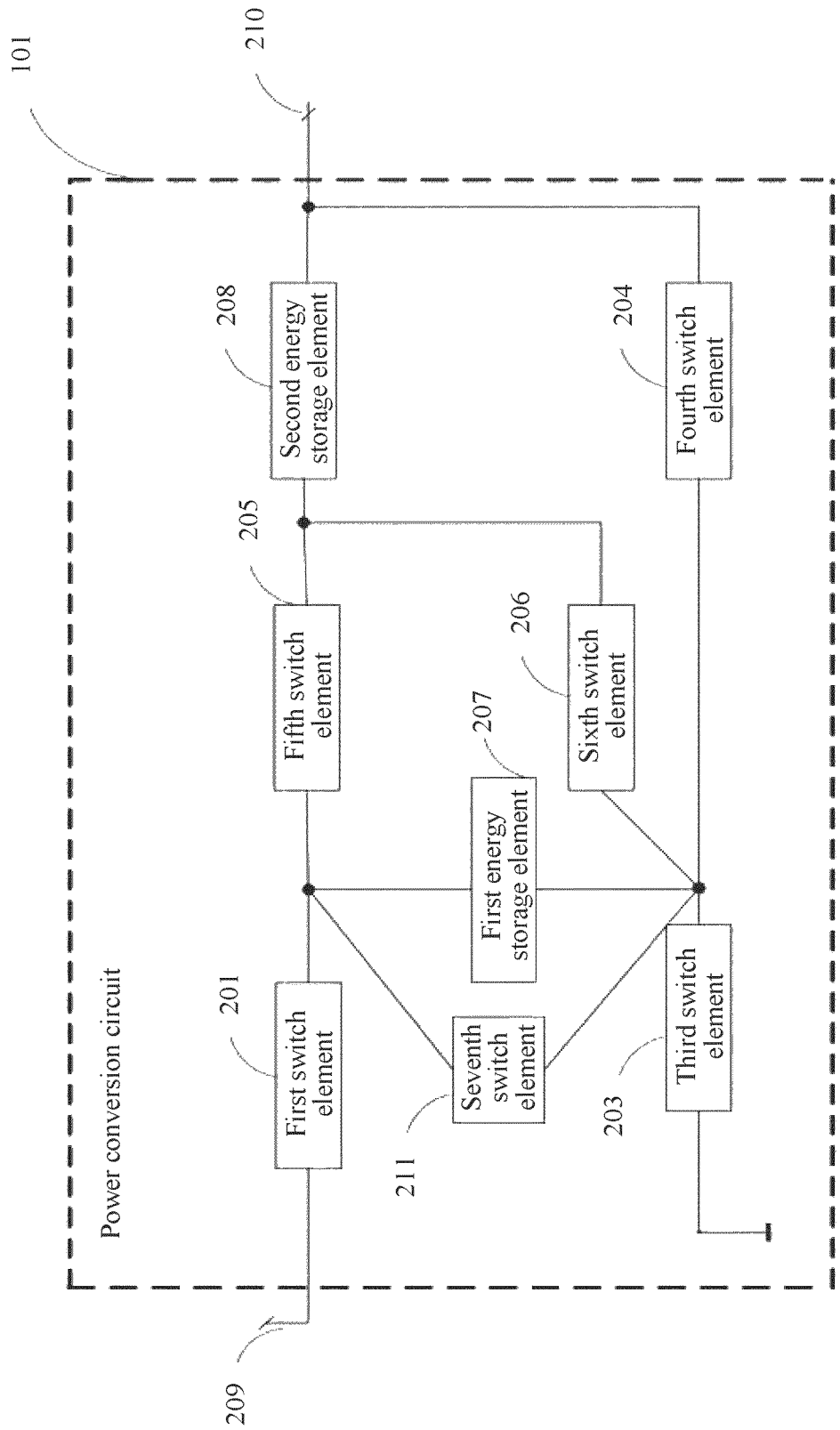
FIG. 18 is another schematic structural diagram of a power conversion circuit according to an embodiment of the present disclosure.

For example, FIG. 18 shows another structure of a power conversion circuit according to an embodiment of the present disclosure. In FIG. 18, the power conversion circuit 101 includes a first switch element 201, a third switch element 203, a fourth switch element 204, a fifth switch element 205, a sixth switch element 206, a seventh switch element 211, a first energy storage element 207, and a second energy storage element 208. A first end of the first switch element 201 is coupled and connected to an input power supply through a first external connection end 209 of the power conversion circuit 101. A second end of the first switch element 201 is separately coupled to a first end of the fifth switch element 205, a first end of the seventh switch element 211, and a first end of the first energy storage element 207. A second end of the first energy storage element 207 is separately coupled to a first end of the third switch element 203, a first end of the fourth switch element 204, a first end of the sixth switch element 206, and a second end of the seventh switch element 211. A first end of the second energy storage element 208 is separately coupled to a second end of the fifth switch element 205 and a second end of the sixth switch element 206. A second end of the second energy storage element 208 is coupled and connected to a battery through a second external connection end 210 of the power conversion circuit 101. A second end of the fourth switch element 204 is coupled to the second external connection end 210. A second end of the third switch element 203 is grounded.

Based on a composition structure of the power conversion circuit shown in FIG. 18, the power conversion circuit may charge the battery based on a first charging mode, a fifth charging mode, or a sixth charging mode. In the first charging mode, in the power conversion circuit 101, the sixth switch element 206 is kept open, and the fifth switch element 205 is kept closed; in a first time period, the first switch element 201 and the fourth switch element 204 are in a closed state, the third switch element 203 is in an open state, and the first energy storage element 207 and the second energy storage element 208 are charged; and in a second time period after the first time period, the first switch element 201 and the fourth switch element 204 are in an open state, the third switch element 203 is in a closed state, and the first energy storage element 207 and the second energy storage element 208 are discharged. In the fifth charging mode, in the power conversion circuit 101, the fourth switch element 204 and the sixth switch element 206 are kept open, and the fifth switch element 205 and the seventh switch element 211 are kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

In the sixth charging mode, in the power conversion circuit 101, the fourth switch element 204 and the fifth switch element 205 are kept open, and the sixth switch element 206 and the seventh switch element 211 are kept closed; in a first time period, the first switch element 201 is in a closed state, the third switch element 203 is in an open state, and the second energy storage element 208 is charged; and in a second time period after the first time period, the first switch element 201 is in an open state, the third switch element 203 is in a closed state, and the second energy storage element 208 is discharged.

For a switch element in the power conversion circuit described in the foregoing embodiments, optionally, magnitude of a gate voltage of the switch element may be changed to close or open the switch element. For example, the first end of the switch element $Q_1$ is coupled and connected to the power supply $V_{BUS}$, and the second end of the switch element $Q_1$ is connected to another element. When the charging apparatus determines that the switch element $Q_1$ needs to be closed, a gate voltage of the switch element $Q_1$ is increased such that the gate voltage is higher than a voltage at the second end of the switch element $Q_1$. In this case, the switch element $Q_1$ is in a low-resistance conducting state. When the charging apparatus determines that the switch element $Q_1$ needs to be opened, the gate voltage of the switch element $Q_1$ is decreased such that the gate voltage is lower than the voltage at the second end of the switch element $Q_1$. In this case, the switch element $Q_1$ is in a high-resistance cut-off state. Because types of switch elements are different, correspondingly, implementations of closing or opening the switch elements are different. This is not limited in the embodiments of the present disclosure.

With reference to the foregoing descriptions, the following describes a specific process of charging the battery by the charging system.

The input/output port 103 of the charging apparatus 100 is connected to the power adapter 501 to obtain the input power supply $V_{BUS}$, and then separately provides power energy for the power conversion circuit 101 and the information collection and signal control circuit 102. The digital core processing element 301 in the information collection and signal control circuit 102 performs protocol-based communication with the power adapter 501 through the input/output port 103; and then determines, based on a charging mode supported by the power adapter 501, a charging mode used by the power conversion circuit 101. For example, the digital core processing element 301 determines that the power adapter 501 supports the foregoing five charging modes; then determines, based on the electrical characteristic of the power supply $V_{BUS}$ that is collected by the information input element 304 and the battery system information collected by the battery information detection element 302, that the third charging mode of the five charging modes has a highest charging rate; and then sets a charging status to the third charging mode. For another example, the digital core processing element 301 determines that the power adapter 501 supports the first charging mode and the second charging mode; then determines, based on the electrical characteristic of the power supply $V_{BUS}$ that is collected by the information input element 304 and the battery system information collected by the battery information detection element 302, that the second charging mode of the two charging modes has a highest charging rate; and then sets a charging status to the second charging mode. The digital core processing element 301 performs protocol-based communication with the power adapter 501 through the input/output port 103; and drives, based on a determined charging mode, the power adapter 501 to adjust a power voltage and/or current input to the charging apparatus 100. The digital core processing element 301 drives closing or opening of each switch element in the power conversion circuit 101 through the output drive element 303 based on the determined charging mode such that the charging apparatus 100 charges the battery element 502. Optionally, the battery information detection element 302 detects that the battery element 502 is fully charged and then notifies the digital core processing element 301. The digital core processing element 301 performs protocol-based communication with the power adapter 501 through the input/output port 103; drives the power adapter 501 to adjust, to 5 V, a voltage input to the charging apparatus 100; and then drives, through the output drive element 303, the power conversion circuit 101 to exit the used charging mode. Because the input/output port 103 is usually a USB port, a standard voltage of the input/output port 103 is 5 V by default.

Based on the descriptions in the foregoing embodiments, a circuit structure of the charging apparatus can support a plurality of different charging modes such that the battery can be charged more quickly, thereby effectively improving charging efficiency.

In the specification and claims of this application, the terms "first", "second", "third", "fourth", and so on are intended to distinguish between different objects but do not indicate a particular order.

It should be understood that in the embodiments of the present disclosure, same elements correspond to similar signs in the accompanying drawings. In addition, the foregoing descriptions of the embodiments in the present disclosure emphasize differences between the embodiments. For same or similar parts that are not mentioned, refer to the embodiments. For brevity, details are not described herein again.

It should be further understood that in this specification, that A is connected to B may indicate that A is directly connected to B, or A is indirectly connected to B. For example, A is connected to B through one or more elements. This is not limited in the embodiments of the present disclosure.

In addition, the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

A person of ordinary skill in the art may be aware that the digital core processing element and the method steps described with reference to the embodiments disclosed in this specification may be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

In the several embodiments provided in this application, it should be understood that the disclosed system, apparatus, and method may be implemented in other manners. For example, the element division is merely logical function division, and there may be other division manners in an implementation. For example, a plurality of elements may be combined or integrated into another system, or some features may be ignored or not performed. In addition, the shown or discussed mutual couplings or communication connections may be implemented using some interfaces. The indirect couplings or communication connections between the apparatuses or units may be implemented in electrical, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A terminal comprising:
a power conversion circuit configured to:
charge a battery in a first charging mode, wherein the battery comprises a positive end and a negative end, wherein the negative end of the battery is grounded, and wherein a control signal time sequence in the first charging mode comprises a first time period and a second time period; and
operate in a first circuit structure in the first charging mode, wherein in the first circuit structure, during the first time period of the first charging mode:
a connection between a first end of a capacitor and an input power supply is configured to be switched on;
a connection between a second end of the capacitor and the positive end of the battery is configured to be switched on;
a connection between the first end of the capacitor and the positive end of the battery is configured to be switched off; and
a connection between the second end of the capacitor and a ground is configured to be switched off,
wherein in the first circuit structure, during the second time period of the first charging mode:
the connection between the first end of the capacitor and the input power supply is configured to be switched off;
the connection between the second end of the capacitor and the positive end of the battery is configured to be switched on;
the connection between the first end of the capacitor and the positive end of the battery is configured to be switched off; and
the connection between the second end of the capacitor and the ground is configured to be switched off,
wherein during the first charging mode, a voltage of the input power supply approaches twice a voltage of the battery.

2. The terminal of claim 1, wherein the battery is configured to be charged by the power conversion circuit in a second charging mode, wherein in the second charging mode, a second control signal time sequence comprises a third time period and a fourth time period, wherein the power conversion circuit is configured to be operated in a second circuit structure in the second charging mode, and wherein in the second circuit structure, during the third time period of the second charging mode:
a connection between a first end of an inductor and the input power supply is configured to be switched on; and
a connection between the first end of the inductor and the ground is configured to be switched off,
wherein in the second circuit structure, during the fourth time period of the second charging mode:
the connection between the first end of the inductor and the input power supply is configured to be switched off; and
the connection between the first end of the inductor and the ground is configured to be switched on,
wherein during the second charging mode, the second end of the inductor is coupled to the positive end of the battery.

3. The terminal of claim 1, wherein the battery is configured to be charged by the power conversion circuit in a third charging mode, wherein in the third charging mode, a third control signal time sequence comprises a fifth time period and a sixth time period, wherein the power conversion circuit is configured to be operated in a third circuit structure in the third charging mode,
wherein in the third circuit structure and during the fifth time period of the third charging mode, a connection between the input power supply and the positive end of the battery is configured to be switched on, and
wherein in the third circuit structure and during the sixth time period of the third charging mode, a connection between the input power supply and the positive end of the battery is configured to be switched off.

4. The terminal of claim 1, wherein the power conversion circuit comprises a first external connection end and a second external connection end.

5. The terminal of claim 4, wherein the first end of the capacitor is connected to the first external connection end.

6. The terminal of claim 1, wherein the power conversion circuit is further configured to couple to an input/output port, and an information collection and signal control circuit.

7. The terminal of claim 6, wherein the input/output port comprises a Universal Serial port (USB).

8. The terminal of claim 6, wherein the information collection and signal control circuit comprises a digital core processing element, a battery information detection element, an output drive element, an information input element, a first power conversion element, and a second power conversion element.

9. The terminal of claim 8, wherein the output drive element is separately coupled to each switch element in the power conversion circuit through a fourth external connection end of the information collection and signal control circuit.

10. The terminal of claim 8, wherein the battery information detection element and the information input element periodically collect information.

11. The terminal of claim 8, wherein the battery information detection element and the information input element dynamically collect information according to a charging requirement.

12. The terminal of claim 1, wherein the terminal comprises a mobile, a tablet computer, a personal digital assistant (PDA), an electronic book reader, or a wearable device.

13. The terminal of claim 1, wherein the first charging mode comprises a low-voltage large-current mode.

14. The terminal of claim 1, wherein the second charging mode comprises a high-voltage large-current mode.

15. A charging apparatus, comprising:
a power conversion circuit to be implemented in a charging method comprising charging, by the power conversion circuit, a battery in a first charging mode, wherein the battery comprises a positive end and a negative end, wherein the negative end of the battery is grounded, wherein a control signal time sequence in the first charging mode comprises a first time period and a second time period, and wherein the power conversion circuit is configured to be operated in a first circuit structure in the first charging mode;
an input/output port; and
an information collection and signal control circuit coupled to the power conversion circuit and the input/output port,
wherein in the first circuit structure, during the first time period of the first charging mode:
  a connection between a first end of a capacitor and an input power supply is configured to be switched on;
  a connection between a second end of the capacitor and the positive end of the battery is configured to be switched on;
  a connection between the first end of the capacitor and the positive end of the battery is configured to be switched off; and
  a connection between the second end of the capacitor and a ground is configured to be switched off,
wherein in the first circuit structure, during the second time period of the first charging mode:
  the connection between the first end of the capacitor and the input power supply is configured to be switched off;
  the connection between the second end of the capacitor and the positive end of the battery is configured to be switched on;
  the connection between the first end of the capacitor and the positive end of the battery is configured to be switched off; and
  the connection between the second end of the capacitor and the ground is configured to be switched off,
wherein during the first charging mode, a voltage of the input power supply approaches twice a voltage of the battery.

16. The charging apparatus of claim 15, wherein the first charging mode comprises a low-voltage large-current mode.

17. The charging apparatus of claim 15, wherein the second charging mode comprises a high-voltage large-current mode.

18. A charging method, comprising:
charging by a power conversion circuit, a battery in a first charging mode, wherein the battery comprises a positive end and a negative end, wherein the negative end of the battery is grounded, wherein a control signal time sequence in the first charging mode comprises a first time period and a second time period, wherein the power conversion circuit is configured to be operated in a first circuit structure in the first charging mode, and
wherein in the first circuit structure, during the first time period of the first charging mode:
  a connection between a first end of a capacitor and an input power supply is configured to be switched on;
  a connection between a second end of the capacitor and the positive end of the battery is configured to be switched on;
  a connection between the first end of the capacitor and the positive end of the battery is configured to be switched off; and
  a connection between the second end of the capacitor and a ground is configured to be switched off,
wherein in the first circuit structure, during the second time period of the first charging mode:
  the connection between the first end of the capacitor and the input power supply is configured to be switched off;
  the connection between the second end of the capacitor and the positive end of the battery is configured to be switched on;
  the connection between the first end of the capacitor and the positive end of the battery is configured to be switched off; and
  the connection between the second end of the capacitor and the ground is configured to be switched off,
wherein during the first charging mode, a voltage of the input power supply approaches twice a voltage of the battery.

19. The charging method of claim 18, wherein the first charging mode comprises a low-voltage large-current mode.

20. The charging method of claim 18, wherein the second charging mode comprises a high-voltage large-current mode.

* * * * *